United States Patent
Yasuda

(10) Patent No.: US 9,762,510 B2
(45) Date of Patent: Sep. 12, 2017

(54) RELAY SYSTEM AND SWITCHING DEVICE

(71) Applicant: Hitachi Metals, Ltd., Minato-ku, Tokyo (JP)

(72) Inventor: Makoto Yasuda, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 35 days.

(21) Appl. No.: 14/838,497

(22) Filed: Aug. 28, 2015

(65) Prior Publication Data
US 2016/0094459 A1  Mar. 31, 2016

(30) Foreign Application Priority Data
Sep. 26, 2014  (JP) ................. 2014-197572

(51) Int. Cl.
H04L 12/931 (2013.01)
H04L 12/947 (2013.01)
H04L 12/46 (2006.01)

(52) U.S. Cl.
CPC ............ *H04L 49/60* (2013.01); *H04L 12/467* (2013.01); *H04L 12/4625* (2013.01); *H04L 49/25* (2013.01)

(58) Field of Classification Search
None
See application file for complete search history.

(56) References Cited

U.S. PATENT DOCUMENTS

| 2008/0068985 | A1  | 3/2008  | Mieno |
| 2011/0292931 | A1* | 12/2011 | Kizawa ................. H04L 45/586 370/354 |
| 2012/0002670 | A1* | 1/2012  | Subramanian ........ H04L 45/583 370/389 |
| 2012/0033541 | A1  | 2/2012  | Jacob Da Silva et al. |
| 2014/0044126 | A1* | 2/2014  | Sabhanatarajan ....... H04L 45/02 370/354 |
| 2014/0140346 | A1* | 5/2014  | Kumagai ................ H04L 45/74 370/392 |
| 2014/0247829 | A1* | 9/2014  | Gautam .............. H04L 29/0653 370/392 |
| 2014/0301401 | A1* | 10/2014 | Wang ...................... H04L 49/70 370/395.53 |

FOREIGN PATENT DOCUMENTS

| JP | 2008-78893 A   | 4/2008 |
| JP | 2013-535922 A  | 9/2013 |
| JP | 2014-107592 A  | 6/2014 |

* cited by examiner

*Primary Examiner* — Charles C Jiang
*Assistant Examiner* — Saad Khawar
(74) *Attorney, Agent, or Firm* — Crowell & Moring LLP

(57) ABSTRACT

When a frame is received at a first port, a MCLAG learning frame transmitting unit generates a MCLAG learning frame containing a source MAC address of the frame and transmits it from a bridge port to a peer device. When the MCLAG learning frame is received and the MCLAG learning frame contains a source MAC address and does not contain a MCLAG identifier, a MCLAG learning frame receiving unit learns a second correspondence relation between a port identifier of the bridge port and the source MAC address to an address table.

12 Claims, 17 Drawing Sheets

FIG. 10A

14: MCLAG TABLE

| MCLAG ID | PORT ID | CONTROL STATE |
|---|---|---|
| {MCLAG1} | {LC[3]}/{Pm1} | FW |
| {MCLAG2} | {LC[2]}/{Pm2} | FW |
| ... | ... | ... |

FIG. 10B

FDB: ADDRESS TABLE

| MAC ADDRESS | VID | MCLAG ID/PORT ID |
|---|---|---|
| MA1 | xxx | {MCLAG1} |
| MA2 | xxx | {MCLAG2} |
| MA3 | xxx | {LC[1]}/{P1} |
| MA4 | xxx | {LC[n]}/{Pb} |
| ... | ... | ... |

RELAY SYSTEM AND SWITCHING DEVICE

CROSS-REFERENCE TO RELATED APPLICATION

The present application claims priority from Japanese Patent Application No. 2014-197572 filed on Sep. 26, 2014, the content of which is hereby incorporated by reference into this application.

TECHNICAL FIELD OF THE INVENTION

The present invention relates to a relay system and a switching device, for example, a relay system in which a link aggregation group is set across two switching devices and the switching device.

BACKGROUND OF THE INVENTION

For example, Japanese Patent Application Laid-Open Publication No. 2014-107592 (Patent Document 1), Japanese Patent Application Laid-Open Publication No. 2013-535922 (Patent Document 2) and Japanese Patent Application Laid-Open Publication No. 2008-78893 (Patent Document 3) disclose a configuration including two switching devices on which an inter-device link aggregation group (hereinafter, abbreviated as LAG) is set. In the system of the Patent Document 1, when a frame is received, a bridge frame for learning is exchanged between the two switching devices. Thus, as shown in FIG. 4 of the Patent Document 1, the two switching devices completely synchronize the address tables including the information of the ports on which the inter-device LAG is not set.

In addition, also in the system of the Patent Document 2, by making a communication between two switching devices, the two switching devices completely synchronize the address tables including the information of the ports on which the inter-device LAG is not set as shown in Table 7 and Table 8 of the Patent Document 2. In the system of the Patent Document 3, when one box-type switch receives a frame, it transmits a MAC (Media Access Control) learning request packet containing a MAC address (SA), VLAN information and a port number to the other box-type switch.

SUMMARY OF THE INVENTION

As a redundant system, for example, a system in which LAG is set on a plurality of ports including respective ports of two switching devices has been known as described in the Patent Document 1 to the Patent Document 3. In this redundant system, unlike the ordinary LAG set in one switching device, LAG is set across two switching devices. Therefore, in addition to general effects obtained by the ordinary LAG such as the redundancy for the fault of communication lines and the expansion of communication band, the redundancy for the fault of switching devices can be achieved.

In this specification, the inter-device LAG as described above is referred to as a multi-chassis link aggregation group (hereinafter, abbreviated as MCLAG). Also, the assembly of the two switching devices on which the MCLAG is set is referred to as a MCLAG switch. Furthermore, when seen from one switching device of the two switching devices, the other switching device is referred to as a peer device.

As described in the Patent Document 1 to the Patent Document 3, in the MCLAG switch, synchronization of address tables is required. For this case, the system of completely synchronizing the address tables including the information of the ports on which the inter-device LAG is not set (hereinafter, referred to as normal port) in the two switching devices may be adopted as described in the Patent Document 1 and the Patent Document 2. In this case, however, since one of the two switching devices needs to manage the information including the information of the normal ports of the other switching device, there is fear that the management may be complicated.

The present invention has been made in view of the problem as described above, and an object of the present invention is to provide a relay system and a switching device capable of easily achieving the synchronization of the address tables.

The above and other objects and novel characteristics of the present invention will be apparent from the description of the present specification and the accompanying drawings.

The following is a brief description of an outline of the typical embodiment of the invention disclosed in the present application.

A relay system according to the present embodiment includes: a first switching device and a second switching device each of which has a plurality of ports including a bridge port and a MCLAG port on which an inter-device LAG is set, and which are connected to each other by a communication line via the bridge ports. The first switching device or the second switching device has a first port on which an inter-device LAG is not set as the plurality of ports. Each of the first switching device and the second switching device includes: an address table; a relay processing unit; a MCLAG learning frame transmitting unit; and a MCLAG learning frame receiving unit. The address table retains a correspondence relation between a port identifier representing the port or a MCLAG identifier associated with the MCLAG port and a MAC address. When a frame is received at a port, the relay processing unit relays the frame based on the address table. When a frame is received at the MCLAG port, the MCLAG learning frame transmitting unit generates a MCLAG learning frame containing a source MAC address of the frame and the MCLAG identifier, and when a frame is received at the first port, the MCLAG learning frame transmitting unit generates a MCLAG learning frame containing the source MAC address of the frame. Then, the MCLAG learning frame transmitting unit transmits the generated MCLAG learning frame from the bridge port to a peer device. When the MCLAG learning frame from a peer device is received at the bridge port and the MCLAG learning frame contains the MCLAG identifier and the source MAC address, the MCLAG learning frame receiving unit learns a first correspondence relation between the MCLAG identifier and the source MAC address to the address table. Meanwhile, when the MCLAG learning frame contains the source MAC address and does not contain the MCLAG identifier, the MCLAG learning frame receiving unit learns a second correspondence relation between a port identifier of the bridge port and the source MAC address to the address table.

The effects obtained by typical embodiments of the invention disclosed in the present application will be briefly described below. That is, it is possible to easily achieve the synchronization of the address tables in the relay system including a MCLAG switch.

BRIEF DESCRIPTIONS OF THE DRAWINGS

FIG. 10A is a schematic diagram showing a configuration example of a MCLAG table in FIG. 9;

FIG. 10B is a schematic diagram showing a configuration example of an address table in FIG. 9;

Figure 1:
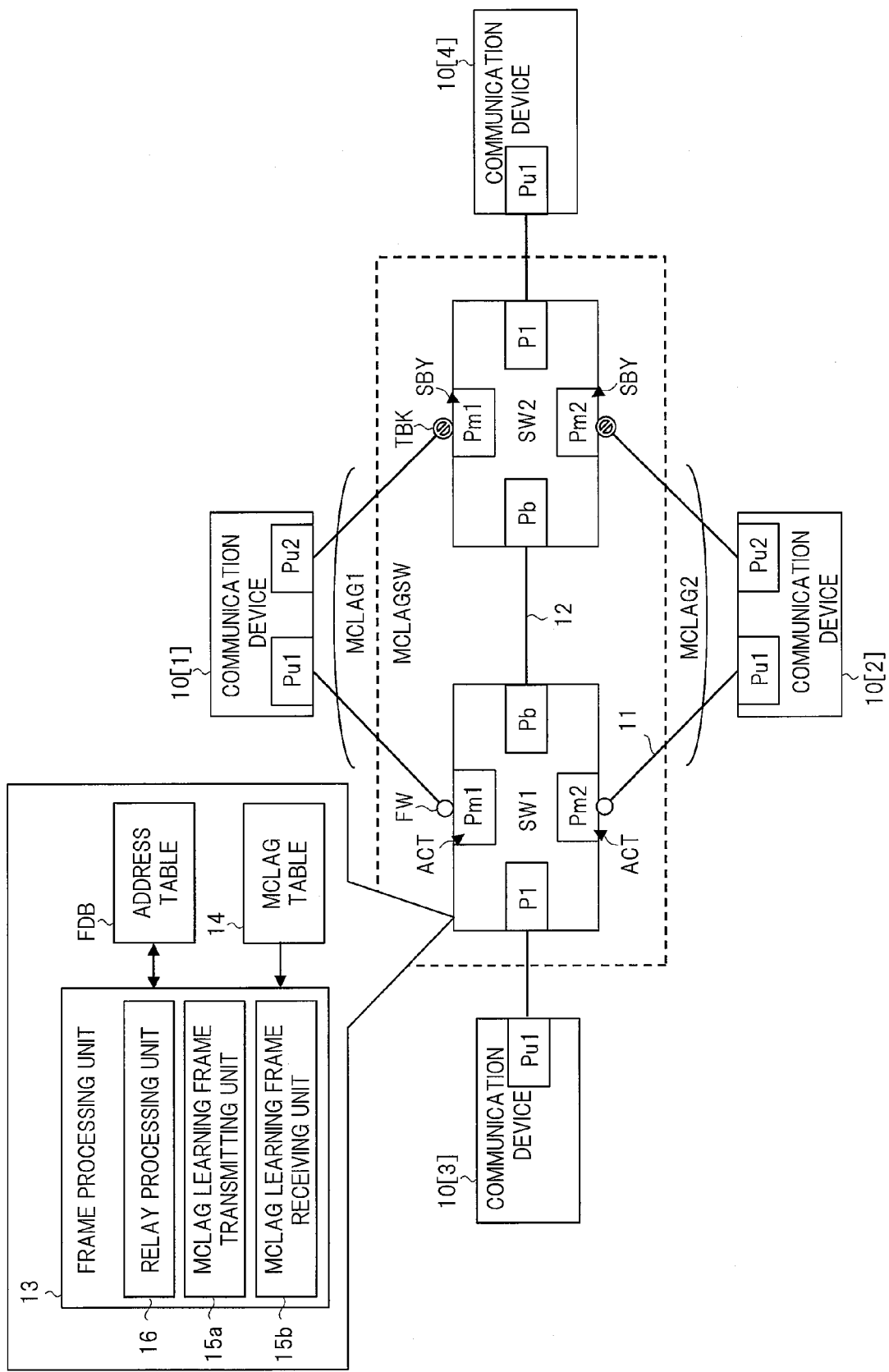
FIG. 1 is a schematic diagram showing a configuration example of a relay system according to the first embodiment of the present invention.
Figure 16:
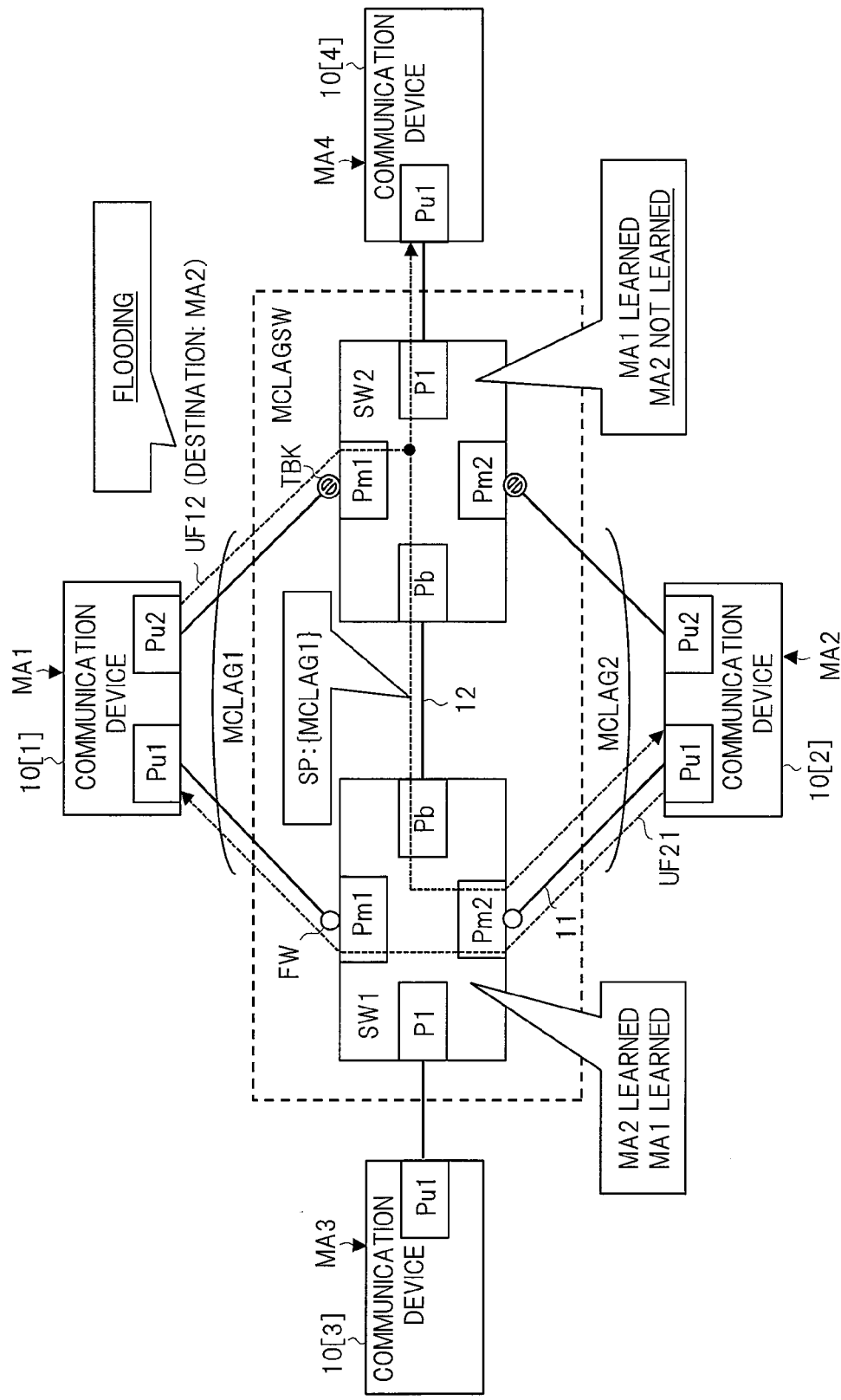
Figure 17:
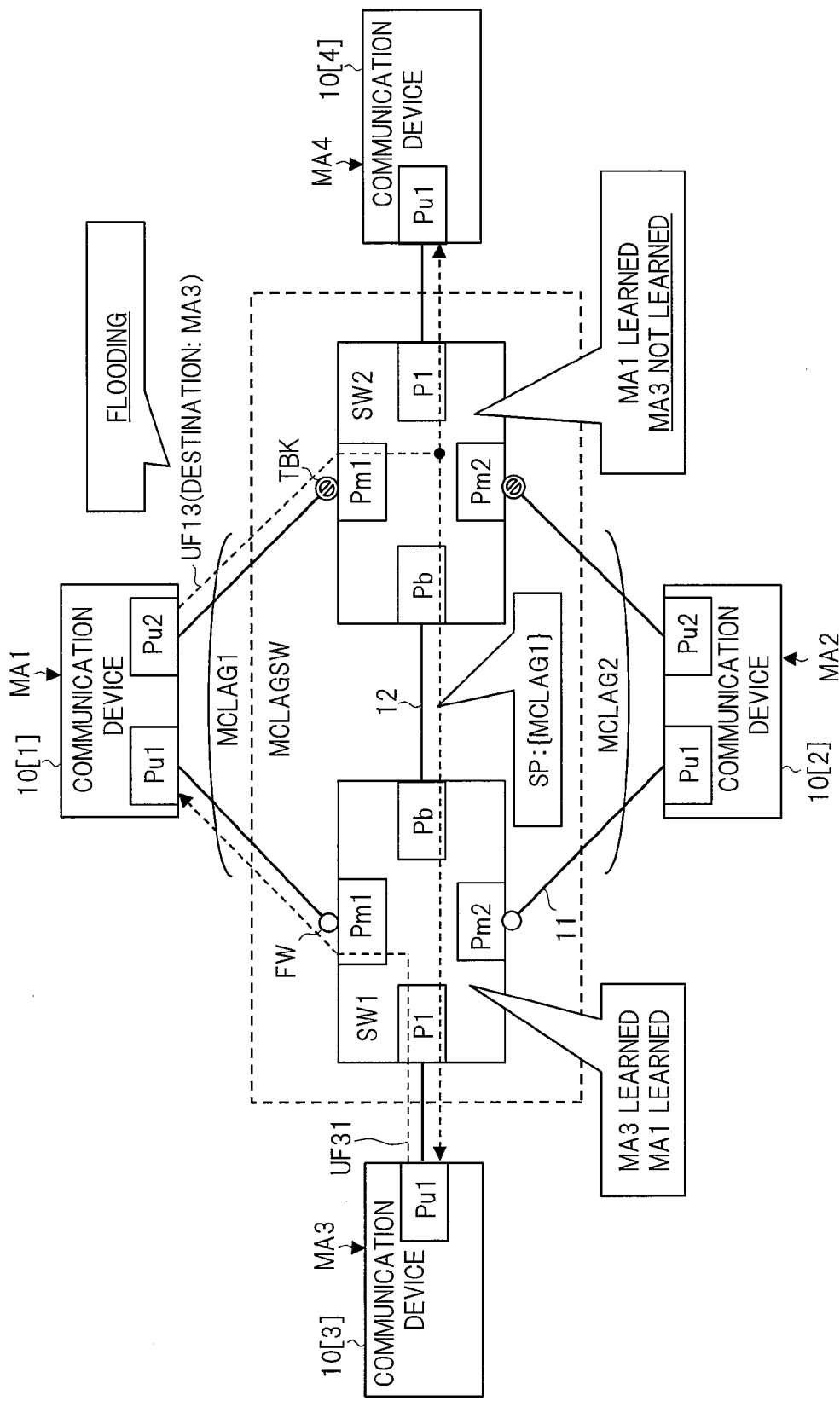

FIG. 16 is a schematic diagram showing an operation example in the case where the MCLAG learning frame transmitting unit and the MCLAG learning frame receiving unit of FIG. 1 are not provided in the relay system studied as a premise of the present invention; and FIG. 17 is a schematic diagram showing another operation example different from that of FIG. 16 in the relay system studied as a premise of the present invention.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

(First Embodiment)

<<Outline of Relay System>>

FIG. 1 is a schematic diagram showing a configuration example of a relay system according to the first embodiment of the present invention. The relay system shown in FIG. 1 includes a MCLAG switch MCLAGSW made up of two switching devices (first and second switching devices) SW1 and SW2 and a plurality of (in this case, four) communication devices 10[1] to 10[4]. Each of the switching devices SW1 and SW2 is, for example, a layer 2 (L2) switch which performs the layer 2 relaying or a layer 3 (L3) switch which performs the layer 3 relaying. In the present embodiment, the case in which the L2 switches are used is taken as an example.

Each of the switching devices (first and second switching device) SW1 and SW2 has a plurality of ports including a bridge port Pb, a plurality of (in this case, two) MCLAG ports Pm1 and Pm2 and a normal port (first port) P1. The inter-device LAG is set on each of the MCLAG ports Pm1 and Pm2, and the inter-device LAG is not set on the normal port (first port) P1. A normal LAG which is not set across the devices may be set on the normal port P1. The switching devices SW1 and SW2 are connected to each other through a communication line 12 via the bridge ports Pb. The communication line 12 is provided as, for example, an Ethernet (registered trademark) line or a dedicated line.

Each of the four communication devices 10[1] to 10[4] is, for example, an information processing device such as a server or a switching device such as a L2 switch. In this case, the communication devices 10[1] and 10[2] have ports Pu1 and Pu2, and the communication devices 10[3] and 10[4] have a ports Pu1. The MCLAG ports Pm1 of the switching devices SW1 and SW2 are connected to the ports Pu1 and Pu2 of the communication device 10[1] through the communication lines 11, respectively. The port Pu1 is connected to the switching device SW1 and the port Pu2 is connected to the switching device SW2.

Similarly, the MCLAG ports Pm2 of the switching devices SW1 and SW2 are connected to the ports Pu1 and Pu2 of the communication device 10[2] through the communication lines 11, respectively. The port Pu1 is connected to the switching device SW1 and the port Pu2 is connected to the switching device SW2. Also, the normal port P1 of the switching device SW1 is connected to the port Pu1 of the communication device 10[3] through the communication line 11, and the normal port P1 of the switching device SW2 is connected to the port Pu1 of the communication device 10[4] through the communication line 11. The communication lines 11 are constituted of, for example, Ethernet lines.

Here, each of the switching devices SW1 and SW2 sets a common LAG (that is, MCLAG) on its own MCLAG port and the MCLAG port of the peer device. For example, the switching device SW1 sets a common MCLAG1 on its own MCLAG port (MCLAG port of SW1) Pm1 and the MCLAG port Pm1 of the peer device (SW2), and the switching device SW2 also sets a common MCLAG1 on its own MCLAG port (MCLAG port of SW2) Pm1 and the MCLAG port Pm1 of the peer device (SW1). Similarly, the switching devices SW1 and SW2 set common MCLAG2 on their MCLAG ports Pm2.

Meanwhile, the communication device 10[1] sets a MCLAG1 on the ports Pu1 and Pu2, and the communication device 10[2] sets a MCLAG2 on the ports Pu1 and Pu2. Although each of the communication devices 10[1] and 10[2] is designed to set the MCLAG on the ports Pu1 and Pu2 in this case, it is enough if a normal LAG is set thereon in practice, and in particular, it is not necessary to separately handle the MCLAG and the LAG. More specifically, the ports Pu1 and Pu2 of the communication devices 10[1] and 10[2] are only required to be LAG ports.

In the configuration mentioned above, as an example of an operation method of the MCLAG switch MCLAGSW, a method of setting an active ACT or a standby SBY to the MCLAG ports serving as member ports for each MCLAG is shown in FIG. 1. In this example, in the MCLAG1, the MCLAG port Pm1 of the switching device SW1 is set to the active ACT and the MCLAG port Pm1 of the switching device SW2 is set to the standby SBY. Similarly, also in the MCLAG2, the MCLAG port Pm2 of the switching device SW1 is set to the active ACT and the MCLAG port Pm2 of the switching device SW2 is set to the standby SBY.

When there is no fault, the MCLAG port set to the active ACT is controlled to a transmission/reception permitted state FW in which transmission and reception are both permitted. On the other hand, the MCLAG port set to the standby SBY is controlled to a transmission prohibited state TBK in which transmission is prohibited and reception is permitted. As a result, for example, a frame directed from the MCLAG switch MCLAGSW to the communication device 10[1] is always transmitted from the MCLAG port Pm1 of the switching device SW1. Meanwhile, a backward frame thereof is transmitted from both of the ports (LAG ports) Pu1 and Pu2 of the communication device 10[1].

In this case, for example, when a fault occurs at the MCLAG port Pm1 of the switching device SW1, the switching operation at the fault occurrence is carried out in the MCLAG switch MCLAGSW. Specifically, in the MCLAG1, the port Pm1 of the switching device SW2 is controlled to the transmission/reception permitted state FW and the port Pm1 of the switching device SW1 is controlled to, for example, a transmission/reception prohibited state in which transmission and reception are both prohibited.

Note that the operation method of the MCLAG switch MCLAGSW is not limited to the method mentioned above and various methods may be adopted. For example, a method in which, when a frame whose destination is the MCLAG1 is received by the switching device SW1, the switching device SW1 transmits the frame and when it is received by the switching device SW2, the switching device SW2 transmits it without setting such an inferior-to-superior relationship to the two switching devices may be adopted. In this method, for example, when a fault occurs at the MCLAG port Pm1 of the switching device SW1, the switching device SW1 relays the received frame to the switching device SW2 and transmits the frame to the MCLAG1 via the MCLAG port Pm1 of the switching device SW2. Also, as another operation method, a method in which MCLAG ports which transmit the frames are equally distributed to the two switching devices SW1 and SW2 based on distribution ID or the like is also applicable.

Also, FIG. 1 shows a schematic configuration example of main parts of the switching devices SW1 and SW2. Here, each of the switching devices SW1 and SW2 includes a frame processing unit 13 for processing frames, an address table FDB and a MCLAG table 14. The MCLAG table 14 retains a MCLAG port (for example, Pm1) in association with a MCLAG identifier (for example, {MCLAG1}). {MCLAG1} indicates an identifier (ID) of the MCLAG1. Hereinafter, {AA} indicates an identifier of "AA" in this specification.

The address table FDB retains the correspondence relation between a port identifier representing a port or a MCLAG identifier associated with a MCLAG port and a MAC address. The frame processing unit 13 includes a MCLAG learning frame transmitting unit 15a, a MCLAG learning frame receiving unit 15b and a relay processing unit 16. When a frame is received at a port, the relay processing unit 16 relays the frame based on the address table FDB. Though details thereof will be described later, the MCLAG learning frame transmitting unit 15a and the MCLAG learning frame receiving unit 15b perform various processes for synchronizing the address tables FDB between the switching devices SW1 and SW2.

<<General Operation of Relay System (Premise) and Problem Thereof>>

FIG. 16 is a schematic diagram showing an operation example in the case where the MCLAG learning frame transmitting unit and the MCLAG learning frame receiving unit of FIG. 1 are not provided in the relay system studied as a premise of the present invention. FIG. 17 is a schematic diagram showing another operation example different from that of FIG. 16 in the relay system studied as a premise of the present invention. In FIG. 16 and FIG. 17, the communication devices 10[1] to 10[4] have MAC addresses MA1 to MA4, respectively.

FIG. 16 shows an example of a frame transfer path between the communication device 10[1] and the communication device 10[2]. When transmitting a user frame, each of the communication devices 10[1] and 10[2] selects one of the ports (LAG ports) Pu1 and Pu2 based on a predetermined distribution rule. In this example, the communication device 10[1] selects the port Pu2 and the communication device 10[2] selects the port Pu1.

The communication device 10[2] transmits a user frame UF21 containing a source MAC address MA2 and a destination MAC address MA1 from the selected port Pu1. The switching device SW1 receives the user frame UF21 and learns the source MAC address MA2 to the address table FDB. Also, the switching device SW1 retrieves the address table FDB to acquire the MCLAG identifier {MCLAG1} as an identifier of a destination port corresponding to the destination MAC address MA1 (hereinafter, referred to as destination port identifier). In this case, in the member ports of the MCLAG1, the MCLAG port Pm1 of the switching device SW1 is controlled to the transmission/reception permitted state FW. Therefore, the switching device SW1 relays the user frame UF21 to the MCLAG port Pm1.

Meanwhile, the communication device 10[1] transmits a user frame UF12 containing a source MAC address MA1 and a destination MAC address MA2 from the selected port Pu2. The switching device SW2 receives the user frame UF12 and learns the source MAC address MA1 to the address table FDB. Also, the switching device SW2 retrieves the address table FDB for a destination port identifier corresponding to the destination MAC address MA2. However, in the example of FIG. 16, since the switching device SW2 has not received a user frame from the communication device 10[2], the address table FDB has not learned the MAC address MA2.

As a result, the switching device SW2 floods the user frame UF12 as shown in FIG. 16. Here, as one of the functions of the MCLAG switch MCLAGSW, the switching device SW2 can add an identifier of a frame reception port (hereinafter, referred to as reception port identifier) to the user frame when relaying the user frame received at the MCLAG port to the bridge port Pb. In the example of FIG. 16, when flooding the user frame UF12 to the bridge port Pb, the switching device SW2 adds the MCLAG identifier {MCLAG1} corresponding to the reception port identifier (SP) to the user frame UF12.

The switching device SW1 receives the user frame UF12 to which the MCLAG identifier {MCLAG1} has been added and learns the source MAC address MA1 of the user frame UF12 in association with the MCLAG identifier {MCLAG1} to the address table FDB. As a result, since the switching device SW1 can learn the MAC address MA1, it can relay the user frame UF21 by unicast as described above.

Also, since the switching device SW1 has learned the MAC address MA2 based on the user frame UF21 as described above, it can relay also the user frame UF12 by unicast. In this case, in the member ports of the MCLAG2, the MCLAG port Pm2 of the switching device SW1 is controlled to the transmission/reception permitted state FW. Therefore, the switching device SW1 relays the user frame UF12 to the MCLAG port Pm2.

Meanwhile, FIG. 17 shows an example of a frame transfer path between the communication device 10[1] and the communication device 10[3]. In this example, when transmitting a user frame UF13, the communication device 10[1] selects the port Pu2 based on a predetermined distribution rule like the case of FIG. 16.

The communication device 10[3] transmits a user frame UF31 containing a source MAC address MA3 and a destination MAC address MA1 from the port Pu1. The switching device SW1 receives the user frame UF31 and learns the source MAC address MA3 to the address table FDB. Also, the switching device SW1 retrieves the address table FDB to acquire the MCLAG identifier {MCLAG1} as a destination port identifier corresponding to the destination MAC address MA1. Then, the switching device SW1 relays the user frame UF31 to the MCLAG port Pm1 controlled to the transmission/reception permitted state FW like the case of FIG. 16.

Meanwhile, the communication device 10[1] transmits the user frame UF13 containing a source MAC address MA1 and a destination MAC address MA3 from the selected port Pu2. The switching device SW2 receives the user frame UF13 and learns the source MAC address MA1 to the address table FDB. Also, the switching device SW2 retrieves the address table FDB for a destination port identifier corresponding to the destination MAC address MA3. However, in the example of FIG. 16, since the switching device SW2 has not received a user frame from the communication device 10[3], the address table FDB has not learned the MAC address MA3.

As a result, the switching device SW2 floods the user frame UF13 like the case of FIG. 16. Consequently, since the switching device SW1 can learn the MAC address MA1 like the case of FIG. 16, it can relay the user frame UF31 by unicast as described above. Also, since the switching device SW1 has learned the MAC address MA3 based on the user frame UF31 as described above, it can transmit the user frame UF13 to the normal port P1 by unicast.

As shown in the examples of FIG. 16 and FIG. 17, when the address tables FDB of the switching device SW1 and the switching device SW2 are not synchronized, the flooding may occur. In the example of FIG. 16, the switching device SW2 executes flooding every time when receiving the user frame UF12, and in the example of FIG. 17, the switching device SW2 executes flooding every time when receiving the user frame UF13. As a result, the communication congestion may occur.

Note that the flooding described above may occur not only in the examples of FIG. 16 and FIG. 17 but also in the case where switching devices through which a frame passes when it is transferred from one of two communication devices to the other communication device and switching devices through which a frame passes when it is transferred in a backward direction thereof do not completely match with each other. Also, the flooding may occur not only in the relaying between MCLAG ports but also in the relaying between a MCLAG port and a normal port. Specifically, when a MCLAG port is included in one of transfer paths, there are two options of the switching devices through which a frame is transferred, and thus there is fear that the flooding may occur.

Therefore, it is desired to synchronize the address tables FDB with respect to the MAC address present ahead of a normal port in addition to the MAC address present ahead of a MCLAG port between the switching device SW1 and the switching device SW2. For example, in the example of FIG. 17, it is desired that, at the time when the switching device SW1 has learned the MAC address MA3 present ahead of the normal port P1, the switching device SW2 also learns the MAC address MA3.

As a method of synchronizing the address tables FDB, the method of completely synchronizing the address tables FDB described in the Patent Document 1 and the Patent Document 2 have been known. In this method, the two switching devices SW1 and SW2 are regarded as one MCLAG switch MCLAGSW, and the correspondence relation between all of the ports provided in this MCLAG switch MCLAGSW and the MAC addresses is shared by the two switching devices SW1 and SW2. For example, in the example of FIG. 17, the switching devices SW1 and SW2 both retain the correspondence relation between the normal port P1 of the switching device SW1 and the MAC address MA3 in the address tables FDB.

However, when the method like this is used, for example, the switching device SW1 has to recognize all of the normal ports provided in the switching device SW2 in advance, and the switching device SW2 also has to recognize all of the normal ports provided in the switching device SW1 in advance. In this case, since each switching device needs to manage not only its own normal ports but also the normal ports of the peer device, the management may be complicated as the number of normal ports increases.

<<General Operation of Relay System (Embodiment)>>

Figure 2:
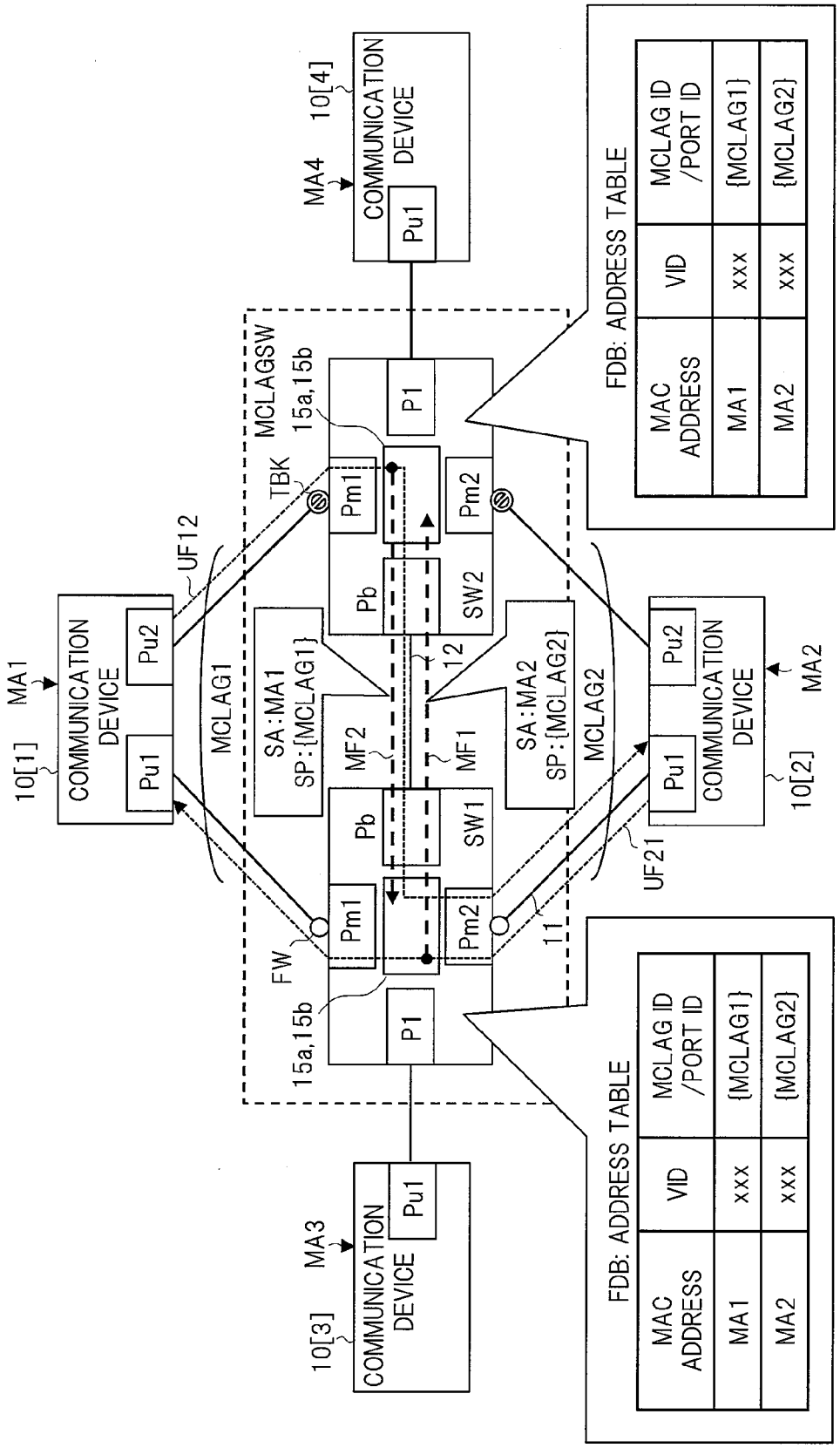
FIG. 2 is a schematic diagram showing an operation example in the relay system of FIG. 1.
Figure 3:
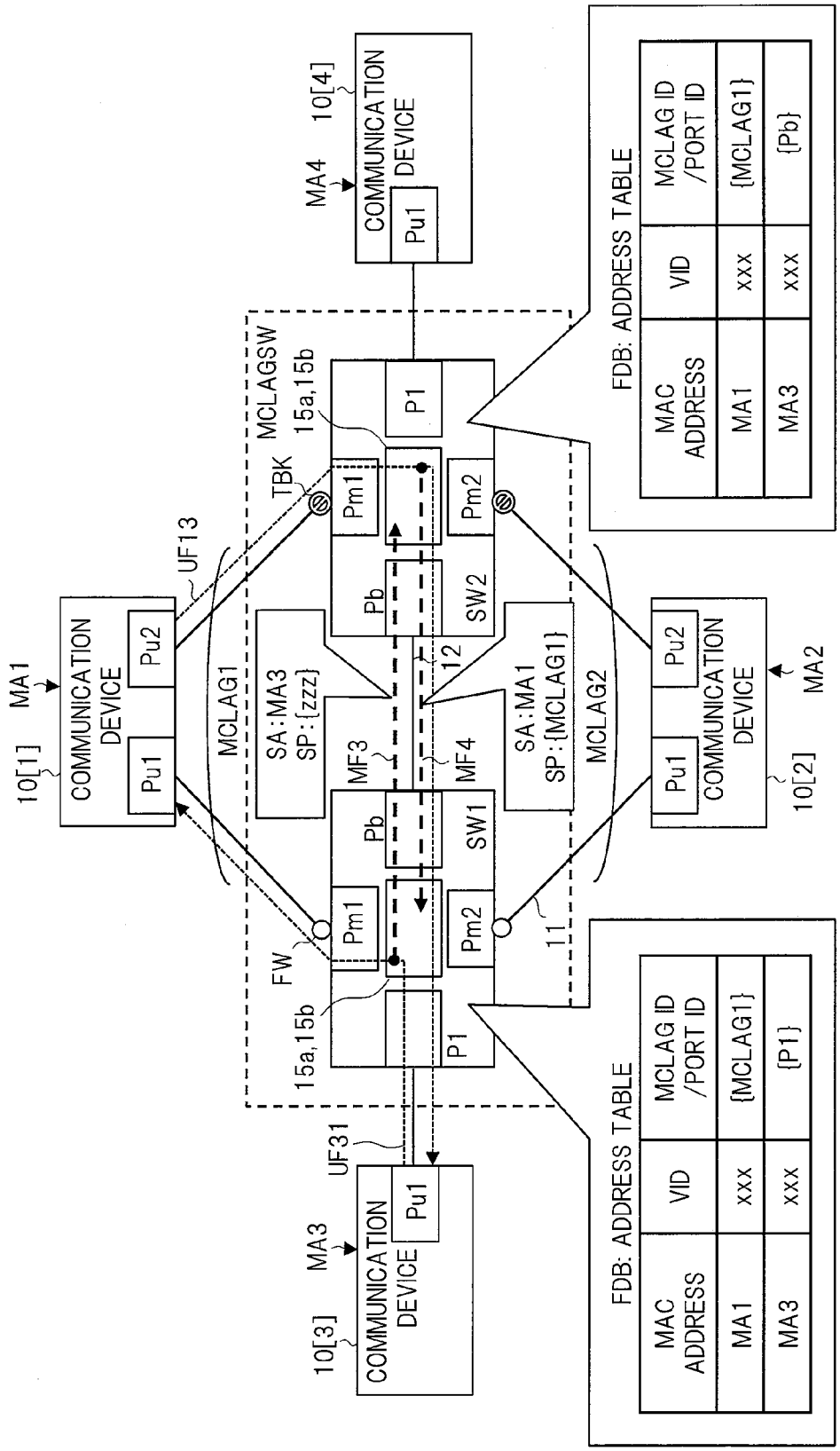
FIG. 3 is a schematic diagram showing an operation example different from that of FIG. 2 in the relay system of FIG. 1.

FIG. 2 is a schematic diagram showing an operation example in the relay system of FIG. 1. FIG. 3 is a schematic diagram showing an operation example different from that of FIG. 2 in the relay system of FIG. 1. In FIG. 2, a frame is transferred between the communication device 10[1] and the communication device 10[2] like the case of FIG. 16. In FIG. 3, a frame is transferred between the communication device 10[1] and the communication device 10[3] like the case of FIG. 17. Hereinafter, descriptions of the parts overlapped with those of FIG. 16 and FIG. 17 will be omitted, and the parts different from those of FIG. 16 and FIG. 17 will be mainly described.

In FIG. 2, the communication device 10[2] transmits the user frame UF21 to the communication device 10[1]. The switching device SW1 receives the user frame UF21 at the MCLAG port Pm2 and learns the source MAC address MA2 of the user frame UF21 in association with the MCLAG identifier {MCLAG2} of the MCLAG port Pm2 to the address table FDB. At this time, in more detail, the switching device SW1 learns also a VLAN (Virtual Local Area Network) identifier (VID) defined by a port VLAN, a tag VLAN and others to the address table FDB. In this embodiment, it is presupposed for the sake of convenience that the same VLAN identifiers (VID) "xxx" are learned to the address table FDB, and the descriptions about the learning of the VLAN identifiers (VID) will be omitted.

Here, the switching device SW1 generates a MCLAG learning frame MF1 by using the MCLAG learning frame transmitting unit 15a. Specifically, upon reception of a frame (user frame UF21) at the MCLAG port Pm2, the MCLAG learning frame transmitting unit 15a generates the MCLAG learning frame MF1 containing a source MAC address SA of the frame and a reception port identifier SP. In this case, the source MAC address SA is the MAC address MA2 and the reception port identifier SP is the MCLAG identifier {MCLAG2}. Then, the MCLAG learning frame transmitting unit 15a transmits the generated MCLAG learning frame MF1 from the bridge port Pb to the peer device (SW2).

Meanwhile, in the switching device SW2, upon reception of the MCLAG learning frame MF1 from the peer device (SW1) at the bridge port Pb, the MCLAG learning frame receiving unit 15b determines whether the MCLAG learning frame MF1 contains a MCLAG identifier. Here, the MCLAG learning frame MF1 contains the MCLAG identifier {MCLAG2} and the source MAC address MA2. In this case, the MCLAG learning frame receiving unit 15b learns a first correspondence relation between the MCLAG identifier {MCLAG2} and the source MAC address MA2 to the address table FDB.

Also, the communication device 10[1] transmits the user frame UF12 to the communication device 10[2]. The switching device SW2 receives the user frame UF12 at the MCLAG port Pm1 and learns the source MAC address MA1 of the user frame UF12 in association with the MCLAG identifier {MCLAG1} of the MCLAG port Pm1 to the address table FDB.

Here, the switching device SW2 generates a MCLAG learning frame MF2 by using the MCLAG learning frame transmitting unit 15a. Specifically, upon reception of a frame (user frame UF12) at the MCLAG port Pm1, the MCLAG learning frame transmitting unit 15a generates the MCLAG learning frame MF2 containing the source MAC address MA1 of the frame and the MCLAG identifier {MCLAG1} like the case of the MCLAG learning frame MF1. Then, the MCLAG learning frame transmitting unit 15a transmits the generated MCLAG learning frame MF2 from the bridge port Pb to the peer device (SW1).

Meanwhile, in the switching device SW1, upon reception of the MCLAG learning frame MF2 from the peer device (SW2) at the bridge port Pb, the MCLAG learning frame receiving unit 15b determines whether the MCLAG learning frame MF2 contains a MCLAG identifier. Here, the MCLAG learning frame MF2 contains the MCLAG identifier {MCLAG1} and the source MAC address MA1. In this case, the MCLAG learning frame receiving unit 15b learns a first correspondence relation between the MCLAG identifier {MCLAG1} and the source MAC address MA1 to the address table FDB.

As a result of performing the process using the MCLAG learning frames MF1 and MF2 described above, the switching devices SW1 and SW2 can learn the MAC address MA1 and the MAC address MA2 to their own address tables FDB unlike the case of FIG. 16. The switching device SW1 acquires the destination port identifier (here, MCLAG identifier {MCLAG1}) corresponding to the destination MAC address MA1 of the user frame UF21 based on its own address table FDB. As a result, the switching device SW1 relays the user frame UF21 to the MCLAG port Pm1 like the case of FIG. 16.

Meanwhile, the switching device SW2 acquires the destination port identifier (here, MCLAG identifier {MCLAG2}) corresponding to the destination MAC address MA2 of the user frame UF12 based on its own address table FDB. Since its own MCLAG port Pm2 serving as a member port of the MCLAG2 is controlled to the transmission prohibited state TBK, the switching device SW2 relays the user frame UF12 to the bridge port Pb.

The switching device SW1 receives the user frame UF12 at the bridge port Pb. Then, the switching device SW1 acquires the destination port identifier (here, MCLAG identifier {MCLAG2}) corresponding to the destination MAC address MA2 of the user frame UF12 based on its own address table FDB. Since its own MCLAG port Pm2 serving as a member port of the MCLAG2 is controlled to the transmission/reception permitted state FW, the switching device SW1 relays the user frame UF12 to the MCLAG port Pm2.

Note that, upon reception of the user frame UF12 at the bridge port Pb, the switching device SW1 performs the learning of the address table FDB by using the MCLAG identifier {MCLAG1} added to the user frame UF12 like the case of FIG. 16. Here, the switching device SW1 can learn the same correspondence relation also by the MCLAG learning frame MF2. Therefore, the learning of the address table FDB based on the user frame UF12 to which the MCLAG identifier has been added becomes unnecessary in some cases. However, the learning of the address table FDB is generally performed when the user frame UF12 is received in principle, and it is desired to perform the learning of the address table FDB also by the user frame UF12 in order to prevent the learning from being undone.

Next, in FIG. 3, the communication device 10[3] transmits the user frame UF31 to the communication device 10[1]. The switching device SW1 receives the user frame UF31 at the normal port P1 and learns the source MAC address MA3 of the user frame UF31 in association with the port identifier {P1} of the normal port P1 to the address table FDB.

Here, the switching device SW1 generates a MCLAG learning frame MF3 by using the MCLAG learning frame transmitting unit 15a. Specifically, upon reception of a frame (user frame UF31) at the normal port (first port) P1, the MCLAG learning frame transmitting unit 15a generates the MCLAG learning frame MF3 containing the source MAC address SA of the frame. In this case, the source MAC address SA is the MAC address MA3.

Also, when the frame is received at the normal port P1 as described above, the MCLAG learning frame MF3 does not contain the reception port identifier SP (for example, empty data) or contains a predetermined fixed value set in advance as the reception port identifier SP (here, {zzz}) unlike the case of FIG. 2. Then, the MCLAG learning frame transmitting unit 15a transmits the generated MCLAG learning frame MF3 from the bridge port Pb to the peer device (SW2).

Meanwhile, in the switching device SW2, upon reception of the MCLAG learning frame MF3 from the peer device (SW1) at the bridge port Pb, the MCLAG learning frame receiving unit 15b determines whether the MCLAG learning frame MF3 contains a MCLAG identifier. Here, the MCLAG learning frame MF3 contains the source MAC address MA3 and does not contain the MCLAG identifier. In this case, the MCLAG learning frame receiving unit 15b learns a second correspondence relation between the port identifier {Pb} of the bridge port Pb and the source MAC address MA3 to the address table FDB.

Also, the communication device 10[1] transmits the user frame UF13 to the communication device 10[3]. The switching device SW2 receives the user frame UF13 at the MCLAG port Pm1 and learns the source MAC address MA1 of the user frame UF13 in association with the MCLAG identifier {MCLAG1} of the MCLAG port Pm1 to the address table FDB.

Here, the switching device SW2 generates a MCLAG learning frame MF4 by using the MCLAG learning frame transmitting unit 15a. Specifically, upon reception of a frame (user frame UF13) at the MCLAG port Pm1, the MCLAG learning frame transmitting unit 15a generates the MCLAG learning frame MF4 containing the source MAC address MA1 of the frame and the MCLAG identifier {MCLAG1} like the case of the MCLAG learning frame MF2. Then, the MCLAG learning frame transmitting unit 15a transmits the generated MCLAG learning frame MF4 from the bridge port Pb to the peer device (SW1).

Meanwhile, in the switching device SW1, upon reception of the MCLAG learning frame MF4 from the peer device (SW2) at the bridge port Pb, the MCLAG learning frame receiving unit 15b determines whether the MCLAG learning frame MF4 contains a MCLAG identifier. Here, the MCLAG learning frame MF4 contains the MCLAG identifier {MCLAG1} and the source MAC address MA1. In this case, the MCLAG learning frame receiving unit 15b learns a first correspondence relation between the MCLAG identifier {MCLAG1} and the source MAC address MA1 to the address table FDB.

As a result of performing the process using the MCLAG learning frames MF3 and MF4 described above, the switching devices SW1 and SW2 can learn the MAC address MA1 and the MAC address MA3 to their own address tables FDB unlike the case of FIG. 17. The switching device SW1 acquires the destination port identifier (here, MCLAG identifier {MCLAG1}) corresponding to the destination MAC address MA1 of the user frame UF31 based on its own address table FDB. As a result, the switching device SW1 relays the user frame UF31 to the MCLAG port Pm1 like the case of FIG. 17.

Meanwhile, the switching device SW2 acquires the destination port identifier (here, port identifier {Pb}) corresponding to the destination MAC address MA3 of the user frame UF13 based on its own address table FDB. Based on this, the switching device SW2 relays the user frame UF13 to the bridge port Pb. The switching device SW1 receives the user frame UF13 at the bridge port Pb. Then, the switching device SW1 acquires the destination port identifier (here, port identifier {P1}) corresponding to the destination MAC address MA3 of the user frame UF13 based on its own address table FDB. Based on this, the switching device SW1 relays the user frame UF13 to the normal port P1.

<<Configuration of MCLAG Learning Frame>>

Figure 4:
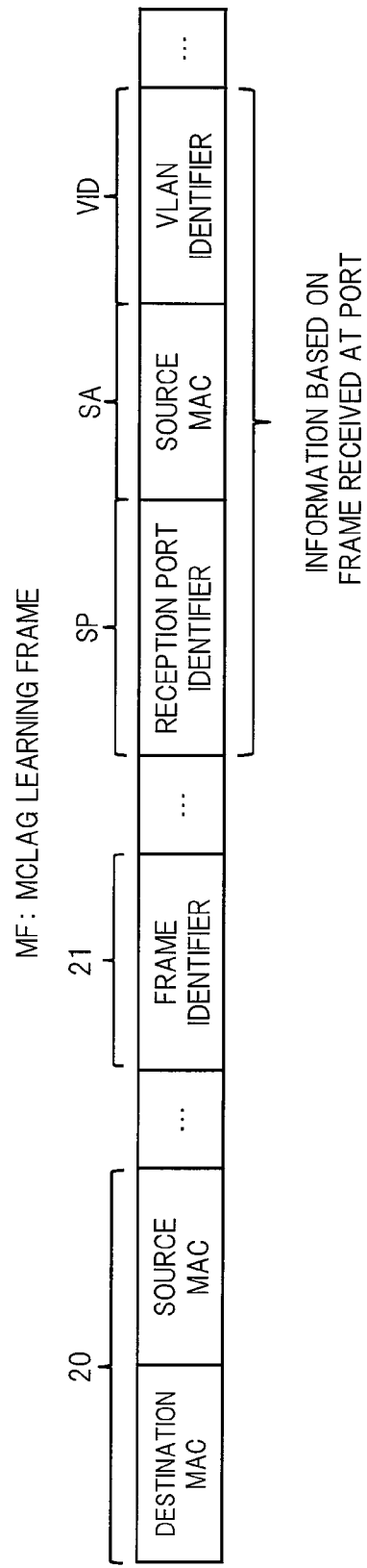
FIG. 4 is a schematic diagram showing a configuration example of a MCLAG learning frame in the relay system of FIG. 2 and FIG. 3.

FIG. 4 is a schematic diagram showing a configuration example of a MCLAG learning frame in the relay system of FIG. 2 and FIG. 3. The MCLAG learning frame MF shown in FIG. 4 includes, for example, a header 20 containing a destination MAC address and a source MAC address, a frame identifier 21, a reception port identifier SP, a source MAC address SA and a VLAN identifier VID.

The reception port identifier SP, the source MAC address SA and the VLAN identifier VID are information based on a user frame received at a MCLAG port or a normal port. For example, in the case of the MCLAG learning frame MF1 of FIG. 2, the reception port identifier SP is {MCLAG2}, the source MAC address SA is MA2 and the VLAN identifier VID is "xxx". Also, in the case of the MCLAG learning frame MF3 of FIG. 3, the reception port identifier SP is {zzz}, the source MAC address SA is MA3 and the VLAN identifier VID is "xxx".

The frame identifier 21 is a predetermined identifier which represents that the frame is the MCLAG learning frame MF. The header 20 contains a destination MAC address and a source MAC address of the MCLAG learning frame MF. For example, in the case of the MCLAG learning frame MF1 of FIG. 2, the destination MAC address is the MAC address of the switching device SW2, and the source MAC address is the MAC address of the switching device SW1.

Upon reception of a frame at the bridge port Pb, the switching devices SW1 and SW2 recognize that the frame is the MCLAG learning frame MF based on the header 20 and the frame identifier 21. Note that the configuration of the MCLAG learning frame MF is not limited to that shown in FIG. 4, and any configuration can be adopted as long as the configuration contains the information capable of recognizing that the frame is the MCLAG learning frame MF, the reception port identifier SP, the source MAC address SA and the VLAN identifier VID.

<<Main Effects of First Embodiment>>

As described above, the relay system of the first embodiment adopts the method in which the MAC address present ahead of the normal port of the peer device is learned in association with the bridge port Pb. Therefore, each of the switching devices SW1 and SW2 can synchronize the address tables FDB (namely, synchronization of learned MAC addresses) without managing the normal port of the peer device. As a result, typically, the management can be facilitated. Also, by the synchronization of the address tables FDB, the communication congestion due to the flooding shown in FIG. 16 and FIG. 17 can be prevented.

(Second Embodiment)

<<General Operation of Relay System (Modification Example)>>

Figure 5:
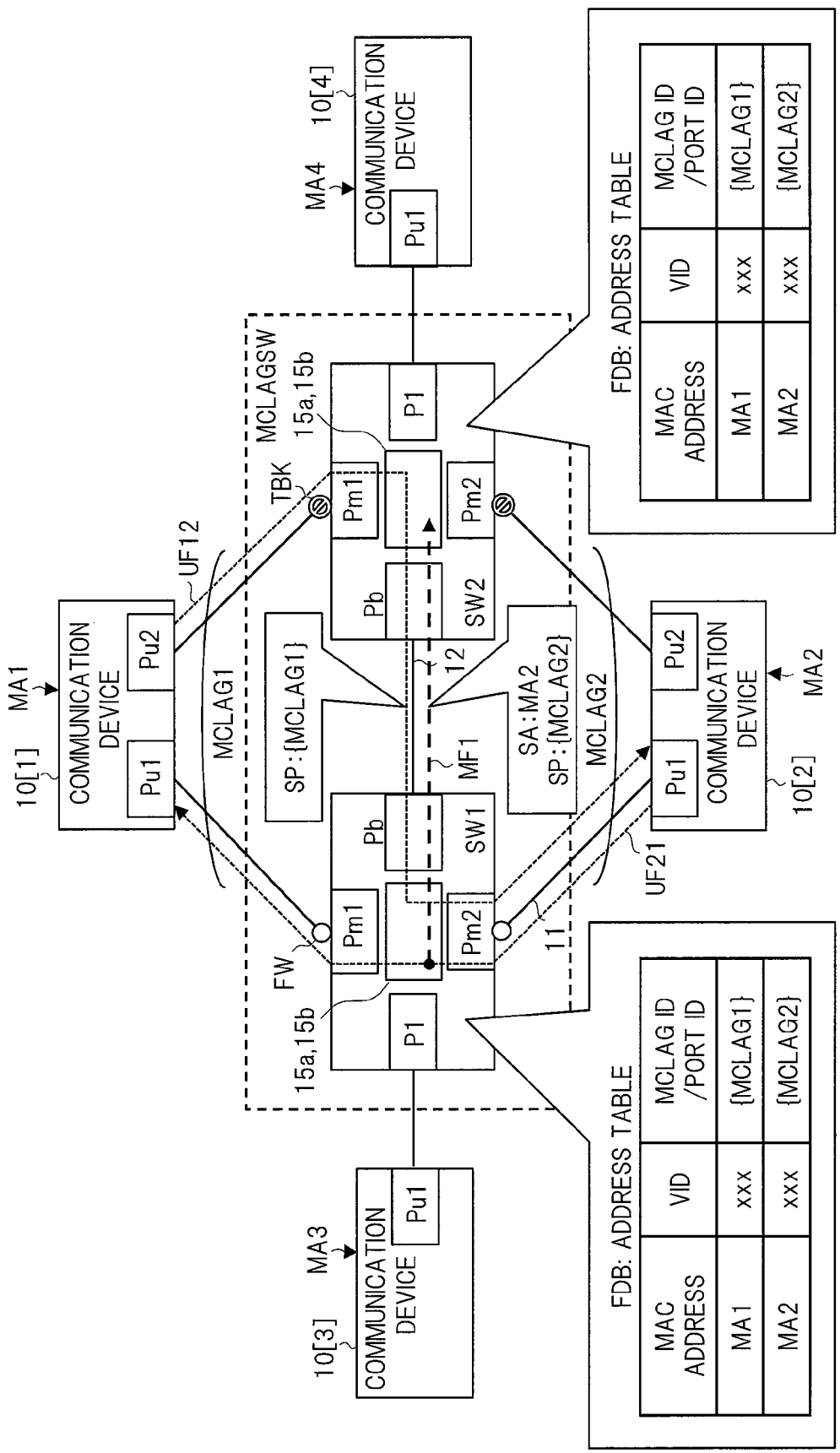
FIG. 5 is a schematic diagram showing an operation example of the relay system of FIG. 1 in a relay system according to the second embodiment of the present invention.
Figure 6:
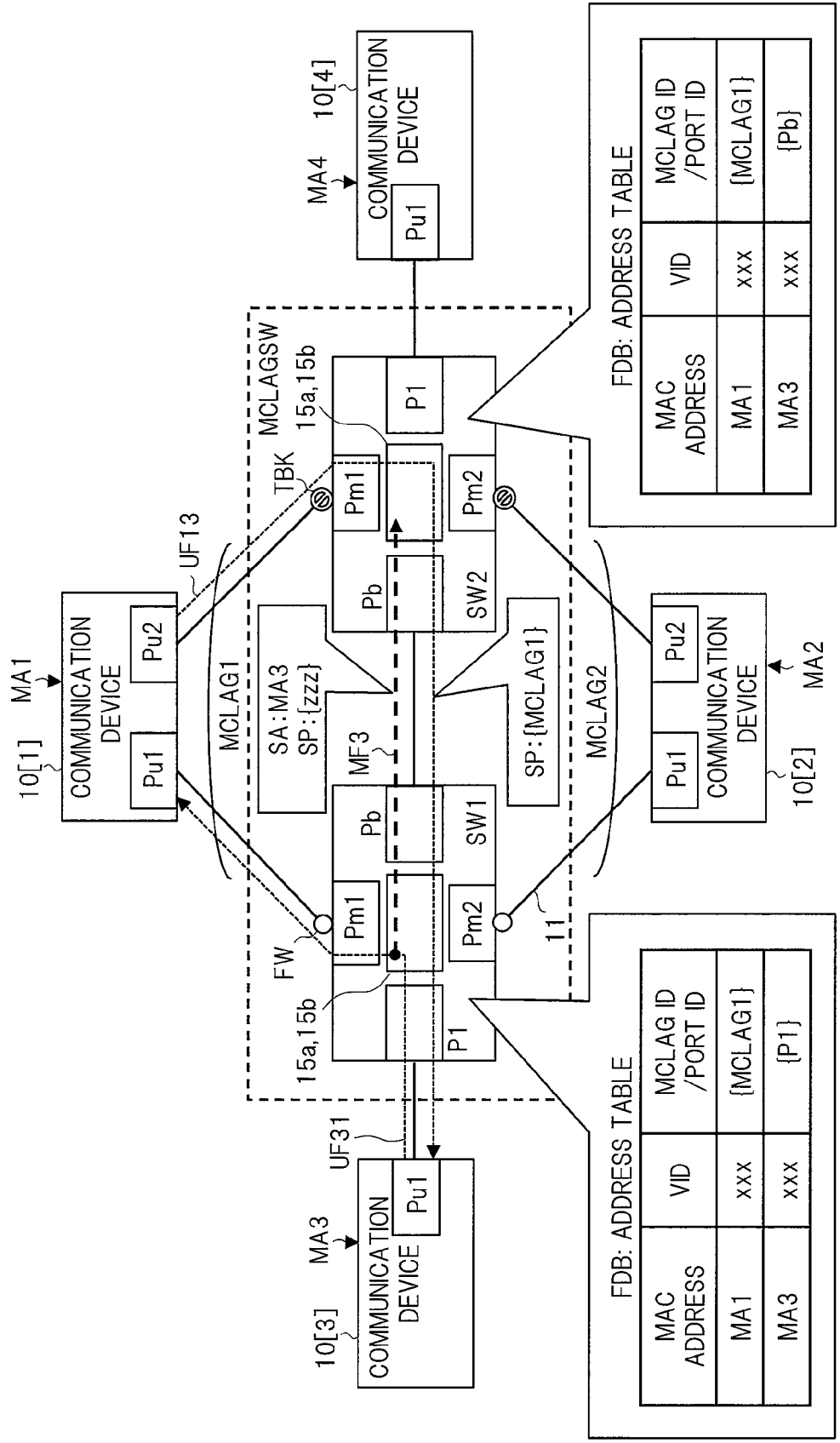
FIG. 6 is a schematic diagram showing an operation example different from that of FIG. 5 in the relay system of FIG. 1.

FIG. 5 is a schematic diagram showing an operation example of the relay system of FIG. 1 in a relay system according to the second embodiment of the present invention. FIG. 6 is a schematic diagram showing an operation example different from that of FIG. 5 in the relay system of FIG. 1. When compared with the operation example shown in FIG. 2, the MCLAG learning frame MF2 is removed in the operation example shown in FIG. 5. When compared with the operation example shown in FIG. 3, the MCLAG learning frame MF4 is removed in the operation example shown in FIG. 6.

In the case of the operation example of FIG. 2, since the user frame UF12 is relayed to the bridge port Pb, the switching device SW1 can perform the learning of the address table FDB by both of the user frame UF12 and the MCLAG learning frame MF2. Similarly, in the case of the operation example of FIG. 3, since the user frame UF13 is relayed to the bridge port Pb, the switching device SW1 can perform the learning of the address table FDB by both of the user frame UF13 and the MCLAG learning frame MF4.

However, though illustrations thereof are omitted, control frames for sharing fault information between the two switching devices SW1 and SW2 and for confirming the living of the respective devices are exchanged between the bridge ports Pb in addition to the user frames described above. In this manner, since a large number of communications are usually performed between the bridge ports Pb, it is desired to suppress the increase of the communication band as much as possible.

Thus, in the operation example of FIG. 5, the switching device SW1 performs the learning of the address table FDB by the user frame UF12 without generating and transmitting the MCLAG learning frame MF2 shown in FIG. 2. Similarly, in the operation example of FIG. 6, the switching device SW1 performs the learning of the address table FDB by the user frame UF13 without generating and transmitting the MCLAG learning frame MF4 shown in FIG. 3. Consequently, the address tables FDB can be synchronized between the switching devices SW1 and SW2 while suppressing the increase of the communication band between the bridge ports Pb.

<<General Operation of Switching Device (Modification Example)>>

Figure 7:
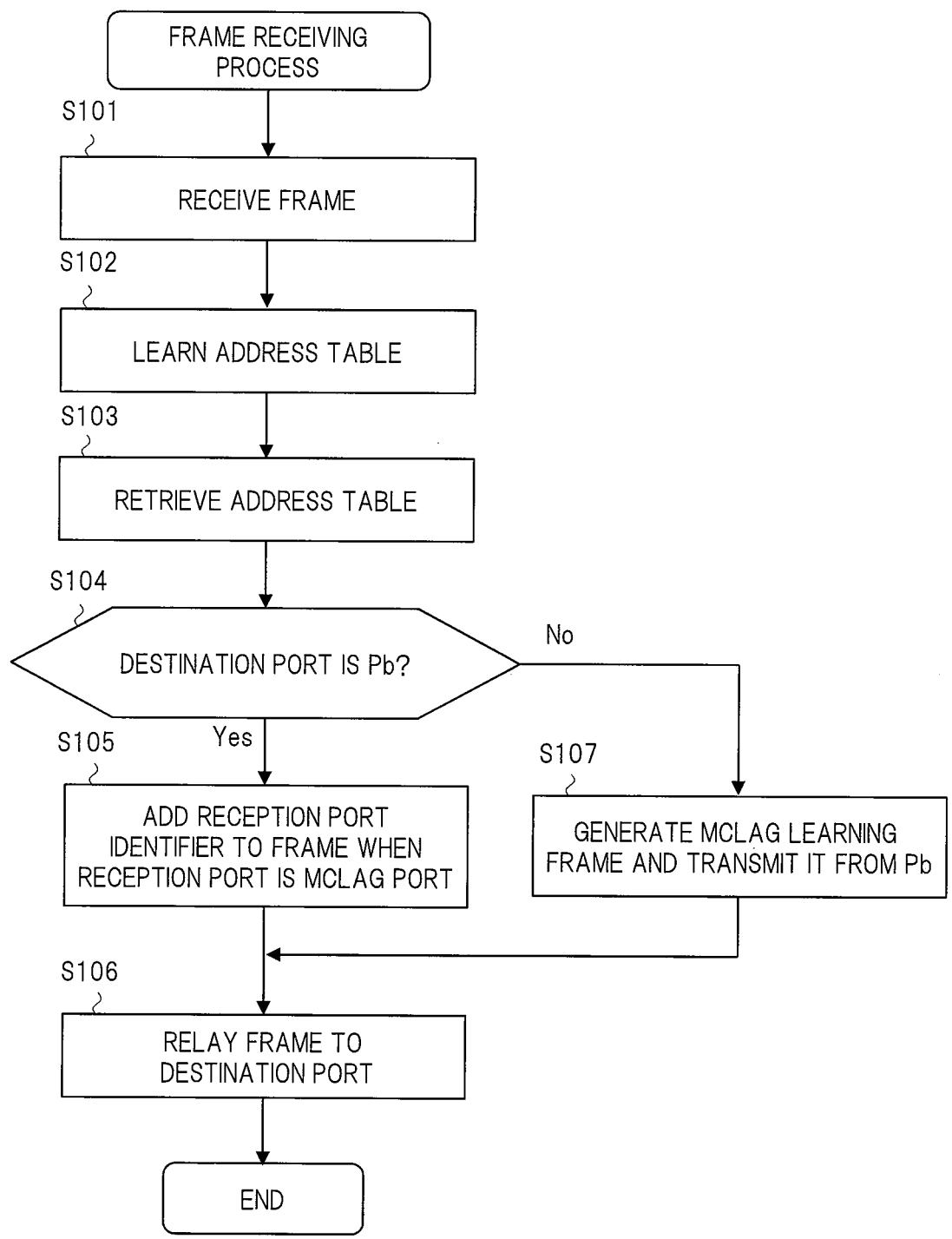
FIG. 7 is a flowchart showing a schematic operation example of each switching device constituting a MCLAG switch in the relay system of FIG. 5 and FIG. 6.

FIG. 7 is a flowchart showing a schematic operation example of each switching device constituting a MCLAG switch in the relay system of FIG. 5 and FIG. 6. As shown in FIG. 7, each of the switching devices SW1 and SW2 (namely, MCLAG learning frame transmitting unit 15a) generates and transmits the MCLAG learning frame MF when a frame is received at the MCLAG port or the normal port (first port) and the destination port of the frame is not the bridge port Pb.

Specifically, when a frame (namely, user frame) is received at a MCLAG port or a normal port (step S101), each of the switching devices SW1 and SW2 (namely, relay processing unit 16) first performs the learning of the address table FDB (step S102). Subsequently, the relay processing unit 16 retrieves the address table FDB to acquire a destination port identifier (step S103).

Then, the relay processing unit 16 determines whether the destination port is the bridge port Pb (step S104). The case in which the destination port is the bridge port Pb corresponds to the case in which the destination port identifier of the user frame UF12 is the MCLAG identifier {MCLAG2} and the destination port turns to the bridge port Pb based on a predetermined operation method of the MCLAG switch MCLAGSW like the case of the switching device SW2 of FIG. 5 (and FIG. 2). Alternatively, it corresponds to the case in which the destination port identifier of the user frame UF13 is the port identifier {Pb} of the bridge port like the case of the switching device SW2 of FIG. 6 (and FIG. 3) or the case in which the flooding occurs due to the mishit of the address table FDB.

When the destination port is the bridge port Pb in the step S104, the relay processing unit 16 adds a MCLAG identifier as the reception port identifier SP if the reception port is the MCLAG port (step S105). For example, in the case of the switching device SW2 of FIG. 5 (and FIG. 2), the MCLAG identifier {MCLAG1} is added to the user frame UF12, and in the case of the switching device SW2 of FIG. 6 (and FIG. 3), the MCLAG identifier {MCLAG1} is added to the user frame UF13. Thereafter, the relay processing unit 16 relays the user frame, to which the reception port identifier SP has been added, to the destination port (here, bridge port Pb) (step S106).

Meanwhile, when the destination port is not the bridge port Pb in the step S104, the MCLAG learning frame transmitting unit 15a generates the MCLAG learning frame MF and transmits it from the bridge port Pb (step S107). For example, in the case of the switching device SW1 of FIG. 5 (and FIG. 2), the MCLAG learning frame MF1 is generated and transmitted, and in the case of the switching device SW1 of FIG. 6 (and FIG. 3), the MCLAG learning frame MF3 is generated and transmitted. Thereafter, the relay processing unit 16 relays the user frame to the destination port (step S106). For example, the relay processing unit 16 of the switching device SW1 of FIG. 5 (and FIG. 2) relays the user frame UF21 to the MCLAG port Pm1.

As described above, by using the relay system of the second embodiment, the increase of the communication band between the bridge ports Pb can be suppressed in addition to the effects similar to those of the first embodiment.

In the above-described case, the MCLAG learning frame MF is generated when the destination port is not the bridge port Pb. Alternatively, in addition to or in place of this condition, the MCLAG learning frame MF may be generated when one of the reception port and the destination port is the MCLAG port. In other words, the MCLAG learning frame transmitting unit 15a does not have to generate the MCLAG learning frame MF when both of the reception port and the destination port are not the MCLAG port. For example, the switching device SW2 of FIG. 5 does not always have to know the MAC address learned when the switching device SW1 relays a user frame between the normal port P1 and a normal port (referred to as P2).

(Third Embodiment)

In the third embodiment, a configuration example and an operation example of the switching devices SW1 and SW2 of the first embodiment described above will described in detail. However, the same configuration example and operation example can be applied also to the switching devices SW1 and SW2 of the second embodiment by performing the operation shown in FIG. 7.

<<Configuration of Switching Device>>

Figure 8:
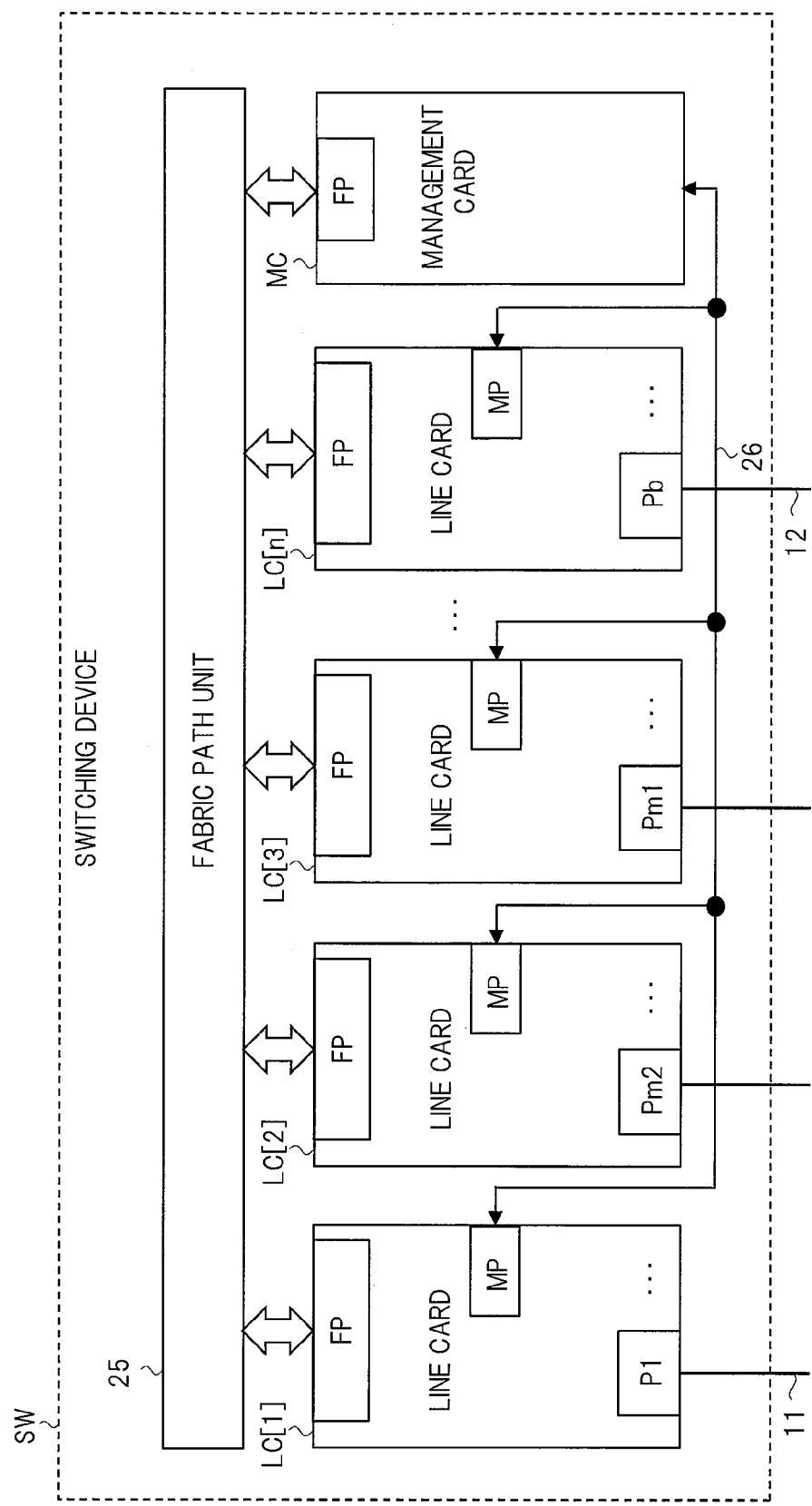
FIG. 8 is a schematic diagram showing a configuration example of a switching device according to the third embodiment of the present invention.

FIG. 8 is a schematic diagram showing a configuration example of a switching device according to the third embodiment of the present invention. In this case, the switching device SW shown in FIG. 8 is a chassis-type switching device in which a plurality of cards are mounted in one chassis. The switching devices SW1 and SW2 of the first and second embodiments may have a box-type configuration. However, when the switching device is managed by a communication carrier and is applied to a carrier network incorporating many user networks, the switching device is desired to have the chassis-type configuration.

The switching device SW of FIG. 8 includes a plurality of (here, n) line cards LC[1] to LC[n], a management card MC and a fabric path unit 25. Each of the line cards LC[1] to LC[n] performs frame communication (transmission and reception) with the outside of the device. The fabric path unit 25 relays the frame between the plurality of line cards LC[1]

to LC[n]. In addition, in this case, the fabric path unit 25 relays the frame also between the plurality of line cards LC[1] to LC[n] and the management card MC. The management card MC manages the n line cards LC[1] to LC[n] and others. In practice, a plurality of the management cards MC are provided in order to improve the availability.

Each of the line cards LC[1] to LC[n] has one or a plurality of external ports, a fabric terminal FP and a management card terminal MP. In the example of FIG. 8, the line card LC[1] has the normal port P1, the line card LC[2] has the MCLAG port Pm2, the line card LC[3] has the MCLAG port Pm1 and the line card LC[n] has the bridge port Pb. However, the correspondence relation between the ports and the line cards can be arbitrarily determined.

The management card terminal MP is connected to the management card MC through a management communication line 26. The fabric terminal FP is connected to the fabric path unit 25 and is connected to the fabric terminals FP of other line cards (and management card) through the fabric path unit 25. Here, for example, the fabric path unit 25 may be made up of a fabric card having a switching function, and may be made up of a wiring board (backplane) in which a slot for attaching and detaching each card is provided.

When the fabric path unit 25 is made up of a fabric card, the fabric terminal FP is connected to the fabric card, and is connected to the fabric terminals FP of other line cards through switching by the fabric card. When the fabric path unit 25 is made up of a backplane, the fabric terminal FP is made up of a plurality of terminals, and the plurality of terminals are respectively connected to the corresponding terminals of other line cards (and management card) via a full-mesh communication line provided on the backplane.

Figure 9:
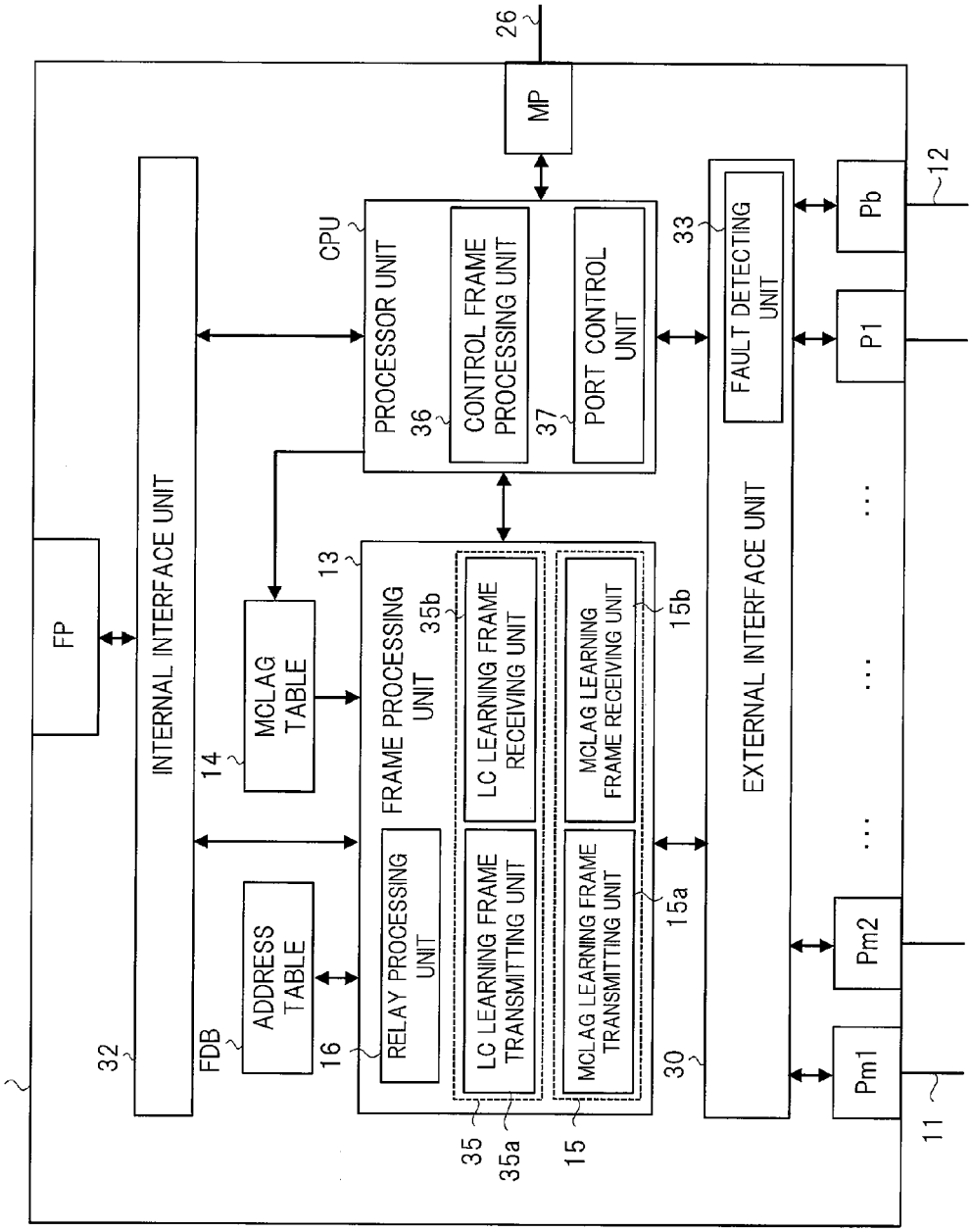
FIG. 9 is a block diagram showing a configuration example of a line card in the switching device of FIG. 8.

FIG. 9 is a block diagram showing a configuration example of a line card in the switching device of FIG. 8. FIG. 10A is a schematic diagram showing a configuration example of a MCLAG table in FIG. 9 and FIG. 10B is a schematic diagram showing a configuration example of an address table in FIG. 9. FIG. 10A and FIG. 10B show examples of contents retained when the configuration example of FIG. 8 is applied to the switching device SW1 of FIG. 2 and FIG. 3. In FIG. 9, for convenience of description, it is presupposed that a plurality of ports including the MCLAG ports Pm1 and Pm2, the normal port P1 and the bridge port Pb are mounted on one line card LC.

In FIG. 9, upon reception of a frame at any of the plurality of ports, an external interface unit 30 adds a reception port identifier indicating the line card and external port which have received the frame to the frame, and then transmits it to a frame processing unit 13 or a processor unit CPU. In addition, the external interface unit 30 transmits a frame from the frame processing unit 13 or the processor unit CPU to any of the plurality of ports based on a destination port identifier.

The external interface unit 30 includes a fault detecting unit 33. The fault detecting unit 33 detects the presence or absence of fault (presence or absence of link down) for each of the plurality of ports by hardware. For example, the fault detecting unit 33 monitors a received optical signal level and detects the presence of link down when an abnormal state such as the insufficiency of the optical signal level continues for a predetermined period. Alternatively, the fault detecting unit 33 monitors the presence or absence of link pulse signal generated in an idle state and the presence or absence of data signal in a non-idle state based on received signals, and detects the presence of link down when an abnormal state such as the absence of both of link pulse signal and data signal continues for a predetermined period.

An internal interface unit 32 controls frame communication between the frame processing unit 13 or the processor unit CPU and the fabric terminal FP. The MCLAG table 14 retains the MCLAG port in association with the MCLAG identifier as shown in FIG. 10A. Also, in this example, the MCLAG table 14 retains also a control state of the MCLAG port of its own switching device. In FIG. 10A, for example, the port identifier {LC[3]}/{Pm1} representing the MCLAG port Pm1 of the line card LC[3] is associated with the MCLAG identifier {MCLAG1} and is controlled to the transmission/reception permitted state FW.

As shown in FIG. 10B, the address table FDB retains the correspondence relation of a port identifier representing a port or a MCLAG identifier associated with a MCLAG port, a MAC address and a VLAN identifier (VID). In FIG. 10B, for example, the MAC address MA1 is retained in association with the VLAN identifier "xxx" and the MCLAG identifier {MCLAG1}. Also, the MAC address MA3 is retained in association with the VLAN identifier "xxx" and the port identifier {LC[1]}/{P1} representing the normal port P1 of the line card LC[1]. Further, the MAC address MA4 is retained in association with the VLAN identifier "xxx" and {LC[n]}/{Pb}.

The processor unit CPU includes a control frame processing unit 36 and a port control unit 37 configured by executing a program stored in a storage unit (not shown). The processor unit CPU can make a communication with the management card MC through the management card terminal MP. The control frame processing unit 36 generates and transmits various control frames. One example of the control frames is a MCLAG control frame for performing the transmission and reception at regular intervals via bridge ports Pb between a switching device and a peer device thereof. By the transmission and the reception of the MCLAG control frame, the fault information relating the MCLAG port can be shared and the living of the respective switching devices can be confirmed.

Also, as another example, the control frames may include a control frame such as Ethernet OAM (Operations, Administration, and Maintenance). In the Ethernet OAM, for example, the continuity with an outside of the device can be monitored by transmitting and receiving a control frame (test frame) referred to as CCM (Continuity Check Message) or the like at regular intervals. In this manner, for example, the presence or absence of fault at the MCLAG ports Pm1 and Pm2 and the normal port P1 can be detected.

The port control unit 37 determines the control state of each MCLAG port in the MCLAG table 14 based on the fault information from the fault detecting unit 33, the fault information from the control frame processing unit 36 and the setting information of the active ACT and standby SBY set in advance. Specifically, the port control unit 37 controls the MCLAG port to the transmission/reception prohibited state or the like when the MCLAG port of its own switching device has a fault. Alternatively, the port control unit 37 controls the MCLAG port to the transmission/reception permitted state FW when the MCLAG port of its own switching device has no fault and is set to the active ACT.

Furthermore, the port control unit 37 controls the MCLAG port of its own switching device in accordance with the presence or absence of fault at the MCLAG port on the active ACT side when the MCLAG port of its own switching device has no fault and is set to the standby SBY. Specifically, the port control unit 37 controls the MCLAG port of its own switching device to the transmission prohibited state TBK when the MCLAG port on the active ACT side has no fault, and it controls the MCLAG port of its own switching device to the transmission/reception permitted state FW when the MCLAG port on the active ACT side has a fault. The information of presence or absence of fault at the MCLAG port on the active ACT side can be acquired by the MCLAG control frame received in the control frame processing unit 36.

The frame processing unit 13 includes the relay processing unit 16, the MCLAG learning frame processing unit 15 and a LC learning frame processing unit 35. As described with reference to FIG. 2, FIG. 3 and others, when a frame is received at a port, the relay processing unit 16 relays the frame based on the address table FDB. Specifically, when a user frame is received at a port, the relay processing unit 16 learns the source MAC address of the user frame in association with the VLAN identifier and the reception port identifier added to the user frame to the address table FDB.

Also, the relay processing unit 16 retrieves the address table FDB with using the destination MAC address and the VLAN identifier of the user frame as retrieval keys, thereby acquiring the destination port identifier. In this case, when the destination port identifier is the MCLAG identifier, the relay processing unit 16 determines the control state of the MCLAG port of its own switching device serving as a member port of the MCLAG identifier based on the MCLAG table 14.

For example, when the control state of the MCLAG port of its own switching device is the transmission/reception permitted state FW, the relay processing unit 16 relays the user frame, to which the destination port identifier representing the MCLAG port has been added, to the MCLAG port. Meanwhile, when the control state is the transmission prohibited state TBK, the relay processing unit 16 relays the user frame, to which the port identifier {Pb} has been added as the destination port identifier, to the bridge port Pb. At this time, when the reception port identifier is the MCLAG identifier, the relay processing unit 16 adds the reception port identifier to the user frame.

The user frame from the relay processing unit 16 is transmitted from the port based on the destination port identifier through the external interface unit 30. At this time, in practice, as can be understood from FIG. 8, the external interface unit 30 (namely, port represented by the destination port identifier) is provided in a different line card in some cases. In this case, the relay processing unit 16 relays the user frame to the different line card through the internal interface unit 32 and the fabric path unit 25. At this time, the fabric path unit 25 relays the user frame to the line card based on the destination port identifier.

The MCLAG learning frame processing unit 15 includes the MCLAG learning frame transmitting unit 15a and the MCLAG learning frame receiving unit 15b. The MCLAG learning frame transmitting unit 15a and the MCLAG learning frame receiving unit 15b perform various operations described in the first embodiment (or second embodiment).

The LC learning frame processing unit 35 includes a LC learning frame transmitting unit 35a and a LC learning frame receiving unit 35b, and is provided in order to synchronize the address tables FDB of the line cards LC[1] to LC[n]. Specifically, the switching device SW of FIG. 8 and FIG. 9 has a mechanism in which the line card which has received a frame at a port determines a destination port of its own line card or a different line card based on the address table FDB of its own line card. Therefore, in order to prevent the unnecessary flooding, it is desired to synchronize the address tables FDB of each of the line cards LC[1] to LC[n].

<<Operation of MCLAG Learning Frame Processing Unit and LC Learning Frame Processing Unit>>

Figure 11:
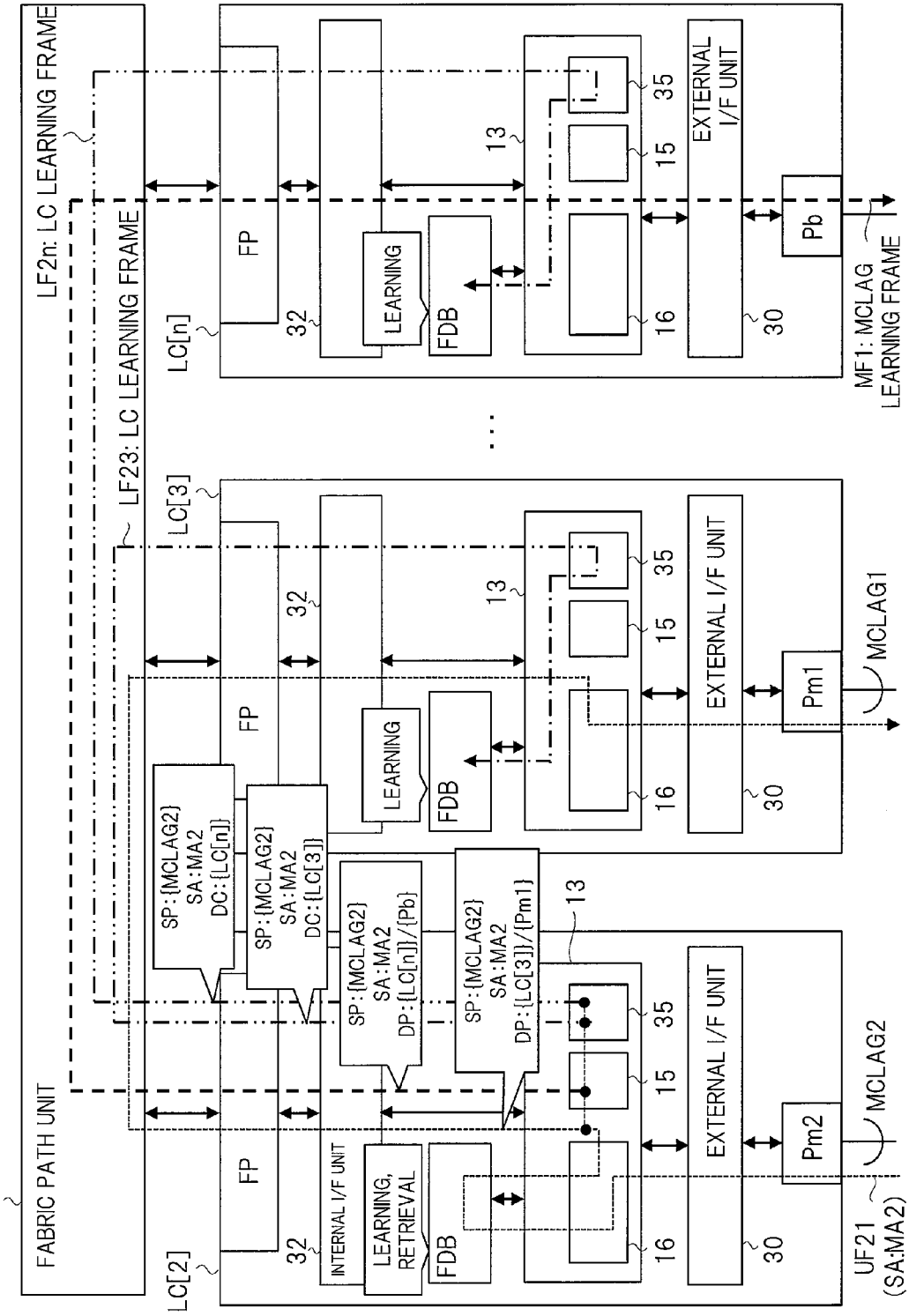
FIG. 11 is an explanatory diagram showing a schematic operation example in the case where a user frame is received in the switching device of FIG. 8 and FIG. 9.
Figure 12:
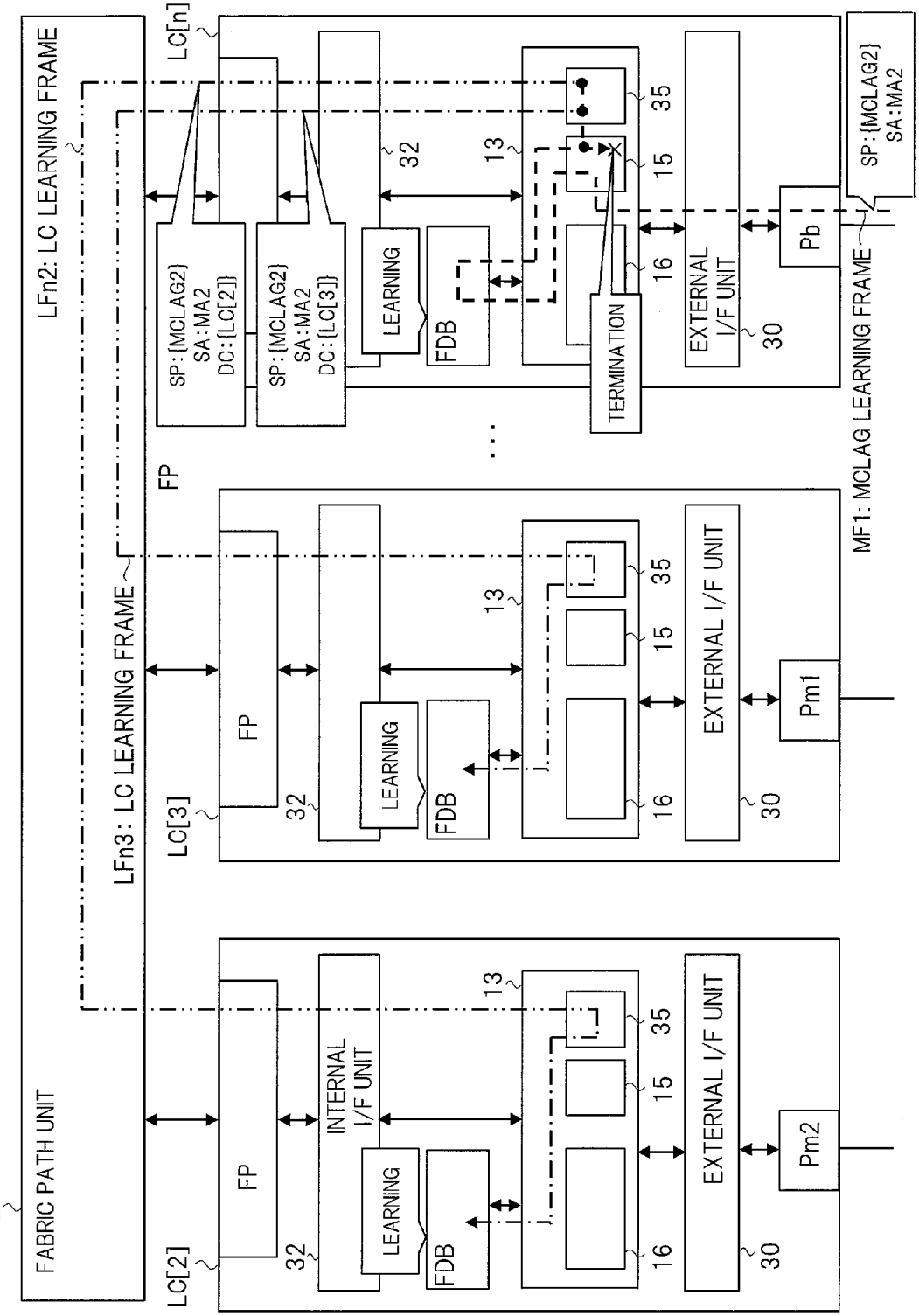
FIG. 12 is an explanatory diagram showing a schematic operation example in the case where a MCLAG learning frame is received in the switching device of FIG. 8 and FIG. 9.

FIG. 11 is an explanatory diagram showing a schematic operation example in the case where a user frame is received in the switching device of FIG. 8 and FIG. 9. FIG. 12 is an explanatory diagram showing a schematic operation example in the case where a MCLAG learning frame is received in the switching device of FIG. 8 and FIG. 9. FIG. 11 shows an operation example in the case where the switching device of FIG. 8 and FIG. 9 is applied to the switching device SW1 of FIG. 2 and the switching device SW1 receives the user frame UF21 at the MCLAG port Pm2. FIG. 12 shows an operation example in the case where the switching device of FIG. 8 and FIG. 9 is applied to the switching device SW2 of FIG. 2 and the switching device SW2 receives the MCLAG learning frame MF1 at the bridge port Pb.

First, in FIG. 11, upon reception of the user frame UF21 at the MCLAG port Pm2, the relay processing unit 16 of the line card LC[2] performs learning and retrieval of the address table FDB. As a result of this retrieval, the relay processing unit 16 acquires the MCLAG identifier {MCLAG1} as the destination port identifier and further acquires the port identifier {LC[3]}/{Pm1} as the actual destination port identifier DP corresponding to the {MCLAG1} based on the MCLAG table 14 of FIG. 10A.

The relay processing unit 16 adds the destination port identifier DP ({LC[3]}/{Pm1}) and the MCLAG identifier {MCLAG2} serving as the reception port identifier SP to the user frame UF21, and transmits it to the fabric path unit 25. The fabric path unit 25 relays the user frame UF21 to the line card LC[3] based on the destination port identifier DP. The external interface unit 30 of the line card LC[3] transmits the user frame UF21 from the MCLAG port Pmt based on the destination port identifier DP ({LC[3]}/{Pm1}).

Also, when a frame is received at a port of its own line card and the frame is not the MCLAG learning frame, the MCLAG learning frame processing unit 15 (namely, MCLAG learning frame transmitting unit 15a) of the line card LC[2] generates and transmits the MCLAG learning frame MF1 shown in FIG. 2. The MCLAG learning frame MF1 contains the MAC address MA2 serving as the source MAC address SA of the user frame UF21 and the MCLAG identifier {MCLAG2} serving as the reception port identifier SP, and further the port identifier {LC[n]}/{Pb} serving as the destination port identifier DP of the MCLAG learning frame MF1 is added to the MCLAG learning frame MF1.

The MCLAG learning frame transmitting unit 15a transmits the MCLAG learning frame MF1, to which the destination port identifier DP (port identifier {LC[n]}/{Pb}) has been added, to the fabric path unit 25. The fabric path unit 25 relays the MCLAG learning frame MF1 to the line card LC[n] based on the destination port identifier DP. The external interface unit 30 of the line card LC[n] transmits the MCLAG learning frame MF1 from the bridge port Pb based on the destination port identifier DP.

Also, when a frame is received at a port of its own line card and the frame is not the MCLAG learning frame, the LC learning frame processing unit 35 (namely, LC learning frame transmitting unit 35a) of the line card LC[2] generates a LC learning frame containing a third correspondence relation between the source MAC address of the frame and the reception port identifier SP. The reception port identifier SP is a port identifier of the port which has received the frame or a MCLAG identifier associated with the port which has received the frame.

In the example of FIG. 11, the LC learning frame transmitting unit 35a generates the LC learning frame containing the MAC address MA2 serving as the source MAC address SA of the user frame UF21 and the MCLAG identifier {MCLAG2} serving as the reception port identifier SP. Then, the LC learning frame transmitting unit 35a transmits the generated LC learning frame to the other line cards except its own line card. At this time, the LC learning frame transmitting unit 35a further adds a destination card identifier DC to each of the LC learning frames directed to the other line cards.

In the example of FIG. 11, the LC learning frame transmitting unit 35a of the line card LC[2] transmits a LC learning frame LF23 containing a card identifier {LC[3]} serving as a destination card identifier DC to the line card LC[3]. Also, the LC learning frame transmitting unit 35a transmits a LC learning frame LF2n containing a card identifier {LC[n]} serving as a destination card identifier DC to the line card LC[n]. Although illustrations thereof are omitted in FIG. 11, the LC learning frame transmitting unit 35a transmits the LC learning frame also to the other line cards LC[1] and LC[4] to LC[n−1] in the same manner. This operation is the same also in FIG. 12 to FIG. 14 described later.

The LC learning frames LF23 and LF2n are relayed through the fabric path unit 25 to the line cards LC[3] and LC[n], respectively. When the LC learning frame processing units 35 (namely, LC learning frame receiving units 35b) of the line cards LC[3] and LC[n] receive the LC learning frames LF23 and LF2n, respectively, they learn the above-mentioned third correspondence relation contained in the LC learning frame to the address tables FDB of their own line cards. More specifically, the LC learning frame receiving unit 35b learns the source MAC address SA (here, MA2) and the reception port identifier SP (here, {MCLAG2}) serving as the third correspondence relation to the address table FDB.

Next, in FIG. 12, upon reception of the MCLAG learning frame MF1 from the peer device at the bridge port Pb, the MCLAG learning frame processing unit 15 (namely, MCLAG learning frame receiving unit 15b) of the line card LC[n] performs the learning of the address table FDB based on the MCLAG learning frame MF1. At this time, as described in FIG. 2, the MCLAG learning frame receiving unit 15b learns the first correspondence relation when the MCLAG learning frame MF1 contains the MCLAG identifier, and learns the second correspondence relation when it does not contain the MCLAG identifier.

In the example of FIG. 12, the MCLAG learning frame MF1 contains the MCLAG identifier {MCLAG2} as the reception port identifier SP and contains the MAC address MA2 as the source MAC address SA. Thus, the MCLAG learning frame receiving unit 15b learns the first correspondence relation between the MCLAG identifier {MCLAG2} and the MAC address MA2 to the address table FDB.

Also, when a frame is received at a port of its own line card and the frame is not the MCLAG learning frame, the MCLAG learning frame processing unit 15 (namely, MCLAG learning frame transmitting unit 15a) of the line card LC[n] generates and transmits the MCLAG learning frame. In this case, since the received frame is the MCLAG learning frame MF1, the MCLAG learning frame transmitting unit 15a terminates the MCLAG learning frame MF1. In this manner, the proliferation of the MCLAG learning frame can be prevented.

Meanwhile, upon reception of the MCLAG learning frame MF1 from the peer device at the bridge port Pb, the LC learning frame processing unit 35 (namely, LC learning frame transmitting unit 35a) of the line card LC[n] generates the LC learning frame containing the first correspondence relation or the second correspondence relation in the MCLAG learning frame receiving unit 15b described above. In the example of FIG. 12, the LC learning frame transmitting unit 35a generates the LC learning frame containing the first correspondence relation between the MCLAG identifier {MCLAG2} and the MAC address MA2.

Then, the LC learning frame transmitting unit 35a transmits the generated LC learning frame to the other line cards except its own line card like the case of FIG. 11. In the example of FIG. 12, the LC learning frame transmitting unit 35a transmits a LC learning frame LFn2 containing a card identifier {LC[2]} serving as a destination card identifier DC in addition to the first correspondence relation to the line card LC[2]. Also, the LC learning frame transmitting unit 35a transmits a LC learning frame LFn3 containing a card identifier {LC[3]} serving as a destination card identifier DC in addition to the first correspondence relation to the line card LC[3].

The LC learning frames LFn2 and LFn3 are relayed through the fabric path unit 25 to the line cards LC[2] and LC[3], respectively. When the LC learning frame processing units 35 (namely, LC learning frame receiving units 35b) of the line cards LC[2] and LC[3] receive the LC learning frames LFn2 and LFn3, respectively, they learn the first correspondence relation or the second correspondence relation (here, first correspondence relation) contained in the LC learning frame to the address tables FDB of their own line cards. More specifically, the LC learning frame receiving unit 35b learns the source MAC address SA (here, MA2) and the reception port identifier SP (here, {MCLAG2}) serving as the first correspondence relation to the address table FDB.

Figure 13:
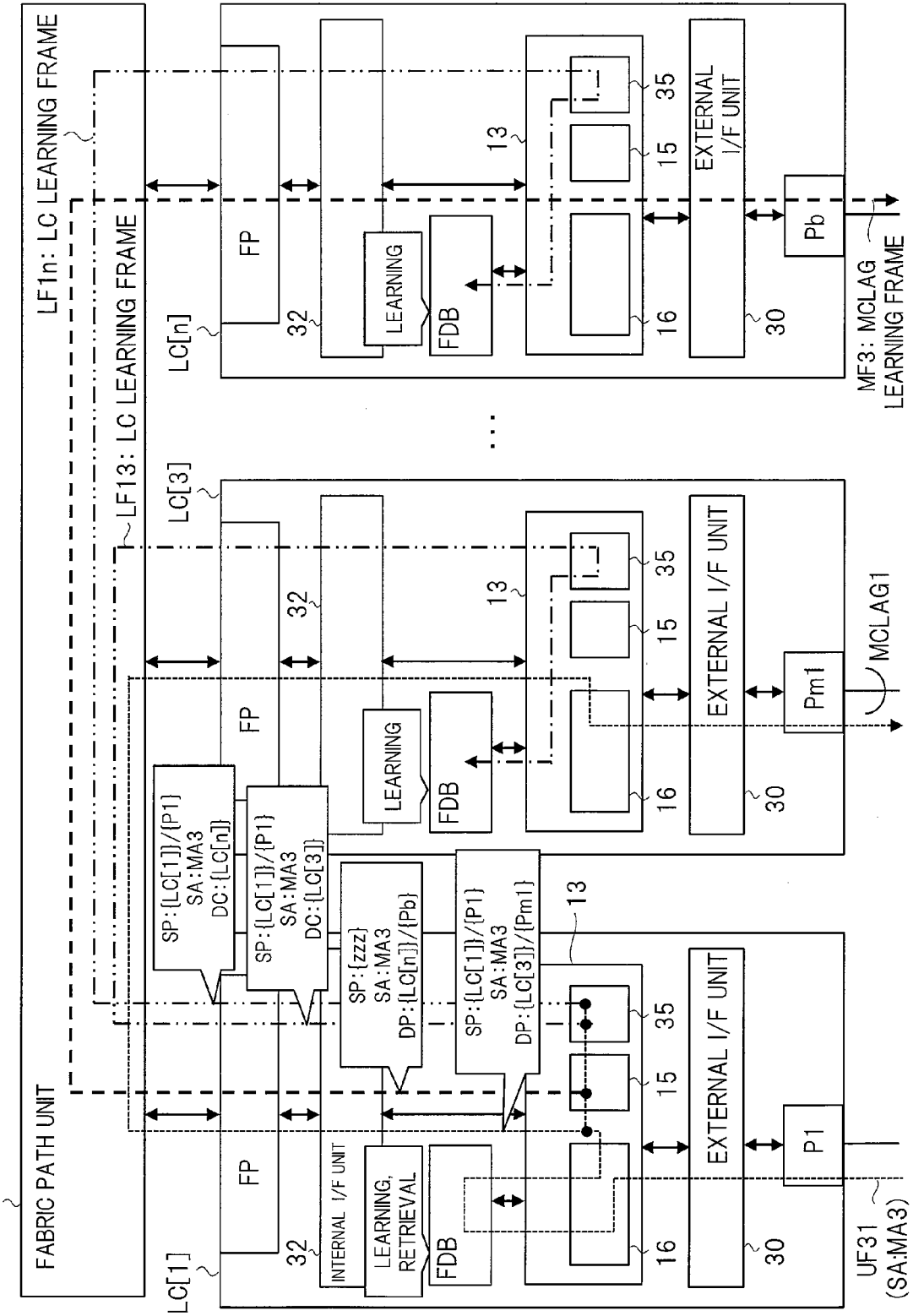
FIG. 13 is an explanatory diagram showing another schematic operation example different from that of FIG. 11, in the case where a user frame is received in the switching device of FIG. 8 and FIG. 9.
Figure 14:
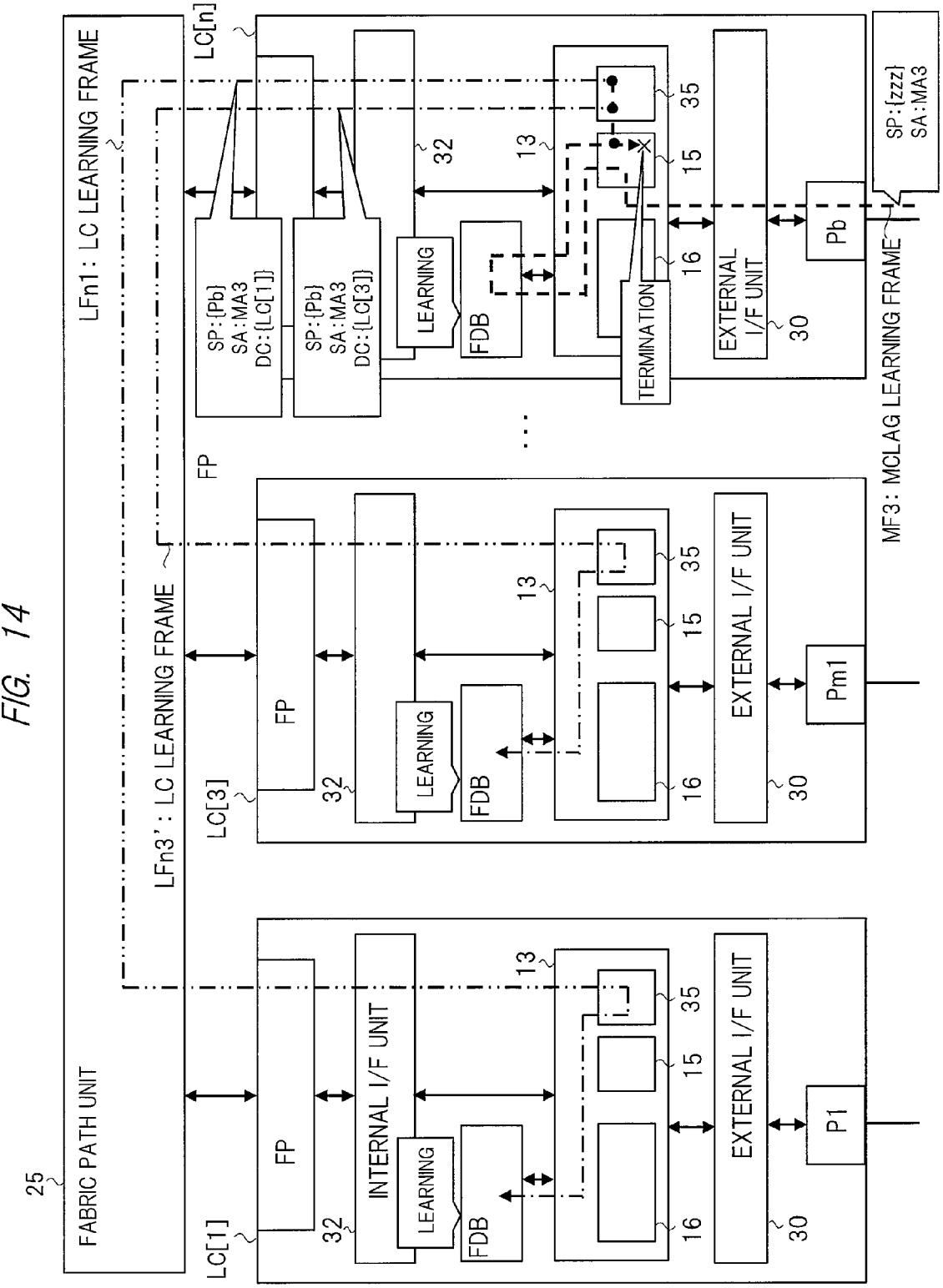
FIG. 14 is an explanatory diagram showing another schematic operation example different from that of FIG. 12, in the case where a MCLAG learning frame is received in the switching device of FIG. 8 and FIG. 9.

FIG. 13 is an explanatory diagram showing another schematic operation example different from that of FIG. 11, in the case where a user frame is received in the switching device of FIG. 8 and FIG. 9. FIG. 14 is an explanatory diagram showing another schematic operation example different from that of FIG. 12, in the case where a MCLAG learning frame is received in the switching device of FIG. 8 and FIG. 9. In FIG. 13, an operation example in the case where the switching device SW1 receives the user frame UF31 at the normal port P1 is shown as an example of the case where the switching device of FIG. 8 and FIG. 9 is applied to the switching device SW1 of FIG. 3. In FIG. 14, an operation example in the case where the switching device SW2 receives the MCLAG learning frame MF3 at the bridge port Pb is shown as an example of the case where the switching device of FIG. 8 and FIG. 9 is applied to the switching device SW2 of FIG. 3.

First, in FIG. 13, upon reception of the user frame UF31 at the normal port P1, the relay processing unit 16 of the line card LC[1] performs learning and retrieval of the address table FDB. As a result of this retrieval, the relay processing unit 16 acquires the MCLAG identifier {MCLAG1} as the destination port identifier and further acquires the port identifier {LC[3]}/{Pm1} as the actual destination port identifier DP corresponding to the {MCLAG1} based on the MCLAG table 14 of FIG. 10A.

The relay processing unit 16 adds the destination port identifier DP ({LC[3]}/{Pm1}) and the port identifier {LC[1]}/{P1} serving as the reception port identifier SP to the user frame UF31, and transmits it to the fabric path unit 25. The fabric path unit 25 relays the user frame UF31 to the line card LC[3] based on the destination port identifier DP. The external interface unit 30 of the line card LC[3] transmits the user frame UF31 from the MCLAG port Pm1 based on the destination port identifier DP ({LC[3]}/{Pm1}).

Also, when a frame is received at a port of its own line card and the frame is not the MCLAG learning frame, the MCLAG learning frame processing unit 15 (namely, MCLAG learning frame transmitting unit 15a) of the line card LC[1] generates and transmits the MCLAG learning frame MF3 shown in FIG. 3. The MCLAG learning frame MF3 contains the MAC address MA3 serving as the source MAC address SA of the user frame UF31.

However, as described in FIG. 3, the MCLAG learning frame MF3 does not contain the reception port identifier SP or contains a predetermined fixed value (here, {zzz}) due to the reception at the normal port P1. In this case, it is presupposed that a predetermined fixed value ({zzz}) is contained. Furthermore, the port identifier {LC[n]}/{Pb} serving as the destination port identifier DP of the MCLAG learning frame MF3 is added to the MCLAG learning frame MF3.

The MCLAG learning frame transmitting unit 15a transmits the MCLAG learning frame MF3, to which the destination port identifier DP (port identifier {LC[n]}/{Pb}) has been added, to the fabric path unit 25. The fabric path unit 25 relays the MCLAG learning frame MF3 to the line card LC[n] based on the destination port identifier DP. The external interface unit 30 of the line card LC[n] transmits the MCLAG learning frame MF3 from the bridge port Pb based on the destination port identifier DP.

Also, when a frame is received at a port of its own line card and the frame is not the MCLAG learning frame, the LC learning frame processing unit 35 (namely, LC learning frame transmitting unit 35a) of the line card LC[1] generates a LC learning frame containing the third correspondence relation between the source MAC address of the frame and the reception port identifier SP. The reception port identifier SP is a port identifier of the port which has received the frame or a MCLAG identifier associated with the port which has received the frame.

In the example of FIG. 13, the LC learning frame transmitting unit 35a generates the LC learning frame containing the MAC address MA3 serving as the source MAC address SA of the user frame UF31 and port identifier {LC[1]}/{P1} serving as the reception port identifier SP. Then, the LC learning frame transmitting unit 35a transmits the generated LC learning frame to the other line cards except its own line card like the case of FIG. 11.

In the example of FIG. 13, the LC learning frame transmitting unit 35a of the line card LC[1] transmits a LC learning frame LF13 containing a card identifier {LC[3]} serving as a destination card identifier DC to the line card LC[3]. Also, the LC learning frame transmitting unit 35a transmits a LC learning frame LF1n containing a card identifier {LC[n]} serving as a destination card identifier DC to the line card LC[n].

The LC learning frames LF13 and LF1n are relayed through the fabric path unit 25 to the line cards LC[3] and LC[n], respectively. When the LC learning frame processing units 35 (namely, LC learning frame receiving units 35b) of the line cards LC[3] and LC[n] receive the LC learning frames LF13 and LF1n, respectively, they learn the above-mentioned third correspondence relation contained in the LC learning frame to the address tables FDB of their own line cards. More specifically, the LC learning frame receiving unit 35b learns the source MAC address SA (here, MA3) and the reception port identifier SP (here, {LC[1]}/{P1}) serving as the third correspondence relation to the address table FDB.

Next, in FIG. 14, upon reception of the MCLAG learning frame MF3 from the peer device at the bridge port Pb, the MCLAG learning frame processing unit 15 (namely, MCLAG learning frame receiving unit 15b) of the line card LC[n] performs the learning of the address table FDB based on the MCLAG learning frame MF3. At this time, as described in FIG. 2, the MCLAG learning frame receiving unit 15b learns the first correspondence relation when the MCLAG learning frame MF3 contains the MCLAG identifier, and learns the second correspondence relation when it does not contain the MCLAG identifier.

In the example of FIG. 12, the MCLAG learning frame MF3 contains the MAC address MA3 as the source MAC address SA, but it does not contain the MCLAG identifier as the reception port identifier SP and contains a predetermined fixed value ({zzz}). Thus, the MCLAG learning frame receiving unit 15b learns the second correspondence relation between the port identifier {Pb} of the bridge port Pb and the MAC address MA3 to the address table FDB.

Also, when a frame is received at a port of its own line card and the frame is not the MCLAG learning frame, the MCLAG learning frame processing unit 15 (namely, MCLAG learning frame transmitting unit 15a) of the line card LC[n] generates and transmits the MCLAG learning frame. In this case, since the received frame is the MCLAG learning frame MF3, the MCLAG learning frame transmitting unit 15a terminates the MCLAG learning frame MF3.

Meanwhile, upon reception of the MCLAG learning frame MF3 from the peer device at the bridge port Pb, the LC learning frame processing unit 35 (namely, LC learning frame transmitting unit 35a) of the line card LC[n] generates the LC learning frame containing the first correspondence relation or the second correspondence relation in the MCLAG learning frame receiving unit 15b described above. In the example of FIG. 14, the LC learning frame transmitting unit 35a generates the LC learning frame containing the second correspondence relation between the port identifier {Pb} and the MAC address MA3.

Then, the LC learning frame transmitting unit 35a transmits the generated LC learning frame to the other line cards except its own line card like the case of FIG. 11. In the example of FIG. 14, the LC learning frame transmitting unit 35a transmits a LC learning frame LFn1 containing a card identifier {LC[1]} serving as a destination card identifier DC in addition to the second correspondence relation to the line card LC[1]. Also, the LC learning frame transmitting unit 35a transmits a LC learning frame LFn3' containing a card identifier {LC[3]} serving as a destination card identifier DC in addition to the second correspondence relation to the line card LC[3].

The LC learning frames LFn1 and LFn3' are relayed through the fabric path unit 25 to the line cards LC[1] and LC[3], respectively. When the LC learning frame processing units 35 (namely, LC learning frame receiving units 35b) of the line cards LC[1] and LC[3] receive the LC learning frames LFn1 and LFn3', respectively, they learn the first correspondence relation or the second correspondence relation (here, second correspondence relation) contained in the LC learning frame to the address tables FDB of their own line cards. More specifically, the LC learning frame receiving unit 35b learns the source MAC address SA (here, MA3) and the reception port identifier SP (here, {Pb}) serving as the second correspondence relation to the address table FDB.

<<Configuration of LC Learning Frame>>

Figure 15:
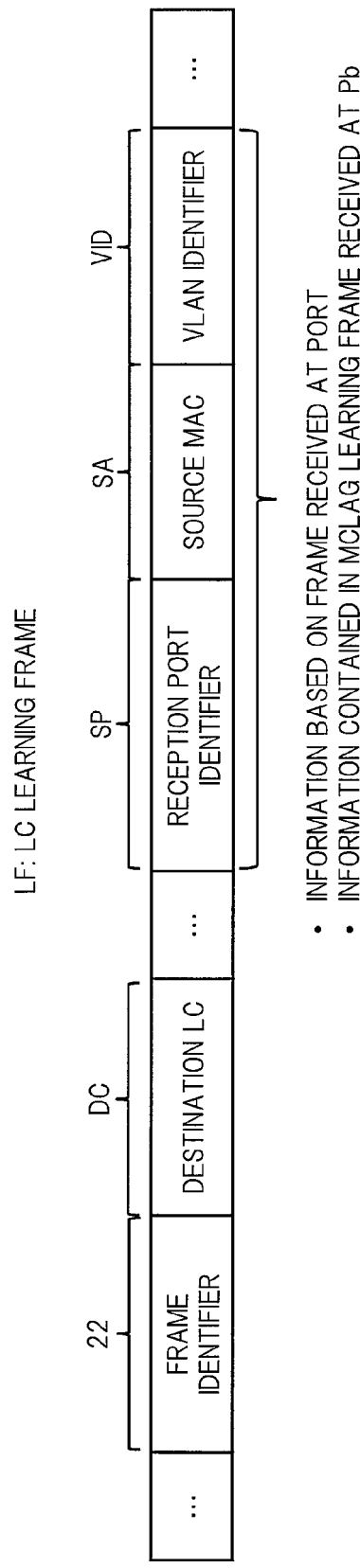
FIG. 15 is a schematic diagram showing a configuration example of a LC learning frame in the relay system of FIG. 11 to FIG. 14.

FIG. 15 is a schematic diagram showing a configuration example of a LC learning frame in the relay system of FIG. 11 to FIG. 14. Though not particularly limited, the LC learning frame LF shown in FIG. 15 contains, for example, a frame identifier 22, the destination card identifier DC, the reception port identifier SP, the source MAC address SA and the VLAN identifier VID.

As shown in FIG. 11 and FIG. 13, when a user frame is received at a MCLAG port or a normal port, the reception port identifier SP, the source MAC address SA and the VLAN identifier VID are the information based on the user frame. On the other hand, as shown in FIG. 12 and FIG. 14, when the MCLAG learning frame MF is received at the bridge port Pb, the reception port identifier SP, the source MAC address SA and the VLAN identifier VID are the information contained in the MCLAG learning frame MF.

The frame identifier 22 is a predetermined identifier which represents that the frame is the LC learning frame LF. As shown in FIG. 11 to FIG. 14, the destination card identifier DC is an identifier which represents the line card to be a destination. The frame processing unit 13 shown in FIG. 9 can recognize the LC learning frame LF and the MCLAG learning frame MF by the frame identifier 22 shown in FIG. 15 and the header 20 and the frame identifier 21 shown in FIG. 4.

As described above, the switching device SW of the third embodiment is mainly characterized by having the mechanism which synchronizes the information contained in a MCLAG learning frame MF between the line cards LC[1] to LC[n] when the MCLAG learning frame MF is received as shown in FIG. 12 and FIG. 14. Thus, the occurrence of flooding which may be caused when a chassis-type switching device is used can be prevented in addition to various effects described in the first and second embodiments.

More specifically, in FIG. 12, even when the line card LC[n] has learned the information contained in the MCLAG learning frame MF1, the problem similar to that of FIG. 16 and FIG. 17 may occur if the line cards LC[2] and LC[3] and others do not learn it. The problem like this can be solved by using the switching device SW of the third embodiment.

Note that, in the configuration described above, all of the line cards LC[1] to LC[n] have the MCLAG learning frame receiving unit 35b. Alternatively, the MCLAG learning frame receiving unit 35b may be provided only in a line card having the bridge port Pb (LC[n] in FIG. 8) in some situations. In this case, however, since the bridge port Pb is provided only in a predetermined line card, there is fear that the user convenience is reduced. In this respect, it is desired that all of the line cards LC[1] to LC[n] have the MCLAG learning frame receiving unit 35b.

Also, in the example of FIG. 13, a predetermined fixed value {zzz} is set as the reception port identifier SP contained in the MCLAG learning frame MF3, but this predetermined fixed value may be used as the port identifier {Pb} of the bridge port Pb. In this case, in FIG. 14, the MCLAG learning frame receiving unit 15b of the line card LC[n] is only required to learn the correspondence relation between this port identifier {Pb} and the MAC address MA3.

In the foregoing, the invention made by the inventor of the present invention has been concretely described based on the embodiments. However, the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
a first switching device and a second switching device each having a plurality of ports including a bridge port and a MCLAG port on which an inter-device LAG is set, the first switching device and the second switching device being connected to each other by a communication line via the bridge ports,
wherein the first switching device or the second switching device has a first port on which an inter-device LAG is not set as the plurality of ports,
each of the first switching device and the second switching device includes:
an address table which retains a correspondence relation between a port identifier representing the MCLAG port or a MCLAG identifier associated with the MCLAG port and a MAC address;
a relay processing unit which, when a frame is received at the MCLAG port, relays the frame based on the address table; and
a MCLAG learning frame transmitting unit which, when the frame is received at the MCLAG port, generates a MCLAG learning frame containing a source MAC address of the frame and the MCLAG identifier, and when the frame is received at the first port, generates a MCLAG learning frame containing the source MAC address of the frame, and transmits the generated MCLAG learning frame from the bridge port to a peer device; and
a MCLAG learning frame receiving unit which, when the MCLAG learning frame from a peer device is received at the bridge port and the MCLAG learning frame contains the MCLAG identifier and the source MAC address, learns a first correspondence relation between the MCLAG identifier and the source MAC address to the address table, and when the MCLAG learning frame contains the source MAC address and does not contain the MCLAG identifier, learns a second correspondence relation between a port identifier of the bridge port and the source MAC address to the address table.

2. The relay system according to claim 1,
wherein each of the first switching device and the second switching device includes:
a plurality of line cards each having any of the plurality of ports, the address table and the relay processing unit; and
a communication line which relays the frame between the plurality of line cards,
the line card having the bridge port includes:
the MCLAG learning frame receiving unit; and
a LC learning frame transmitting unit which wherein, when the MCLAG learning frame from the peer device is received at the bridge port, generates a LC learning frame containing the first correspondence relation or the second correspondence relation at the MCLAG learning frame receiving unit, and transmits the generated LC learning frame to the other line cards except its own line card, and
the other line cards each include a LC learning frame receiving unit which, when the LC learning frame is received, learns the first correspondence relation or the second correspondence relation contained in the LC learning frame to the address table.

3. The relay system according to claim 2,
wherein the LC learning frame transmitting unit, the LC learning frame receiving unit and the MCLAG learning frame transmitting unit are provided in each of the plurality of line cards,
when the MCLAG learning frame transmitting unit has received the frame at a port of its own line card and the frame is not the MCLAG learning frame, the MCLAG learning frame transmitting unit generates and transmits the generated MCLAG learning frame,
when the LC learning frame transmitting unit has received the frame at a port of its own line card and the frame is not the MCLAG learning frame, the LC learning frame transmitting unit generates a LC learning frame containing a third correspondence relation between the source MAC address of the frame and the port identifier of the port which has received the frame or the MCLAG identifier associated with the port which has received the frame, and transmits the generated LC learning frame to the other line cards except its own line card, and
when the LC learning frame receiving unit has received the LC learning frame, it learns the third correspondence relation contained in the LC learning frame to the address table.

4. The relay system according to claim 1,
wherein, when the frame is received at the MCLAG port or the first port and a destination port of the frame is not the bridge port, the MCLAG learning frame transmitting unit generates and transmits the MCLAG learning frame.

5. The relay system according to claim 4,
wherein, when both of a port which has received the frame and a destination port of the frame are not the MCLAG port, the MCLAG learning frame transmitting unit does not generate the MCLAG learning frame.

6. The relay system according to claim 1,
wherein, when both of a port which has received the frame and a destination port of the frame are not the MCLAG port, the MCLAG learning frame transmitting unit does not generate the MCLAG learning frame.

7. A switching device having a plurality of ports including a bridge port, a MCLAG port on which an inter-device LAG is set and a first port on which an inter-device LAG is not set, the bridge port being connected to a bridge port of a different switching device, the switching device comprising:
an address table which retains a correspondence relation between a port identifier representing the port or a MCLAG identifier associated with the MCLAG port and a MAC address;
a relay processing unit which, when a frame is received at the port, relays the frame based on the address table; and
a MCLAG learning frame transmitting unit which, when the frame is received at the MCLAG port, generates a MCLAG learning frame containing a source MAC address of the frame and the MCLAG identifier and when the frame is received at the first port, generates a MCLAG learning frame containing the source MAC address of the frame, and transmits the generated MCLAG learning frame from the bridge port to the different switching device; and
a MCLAG learning frame receiving unit which, when the MCLAG learning frame from the different switching device is received at the bridge port and the MCLAG learning frame contains the MCLAG identifier and the source MAC address, learns a first correspondence relation between the MCLAG identifier and the source MAC address to the address table, and when the MCLAG learning frame contains the source MAC address and does not contain the MCLAG identifier, learns a second correspondence relation between a port identifier of the bridge port and the source MAC address to the address table.

8. The switching device according to claim 7, further comprising:
a plurality of line cards each having any of the plurality of ports, the address table and the relay processing unit; and
a communication line which relays the frame between the plurality of line cards,
wherein the line card having the bridge port includes:
the MCLAG learning frame receiving unit; and
a LC learning frame transmitting unit which, when the MCLAG learning frame from the different switching device is received at the bridge port, generates a LC learning frame containing the first correspondence relation or the second correspondence relation at the MCLAG learning frame receiving unit, and transmits the generated LC learning frame to the other line cards except its own line card, and
the other line cards each include a LC learning frame receiving unit which, when the LC learning frame is received, learns the first correspondence relation or the second correspondence relation contained in the LC learning frame to the address table.

9. The switching device according to claim 8,
wherein the LC learning frame transmitting unit, the LC learning frame receiving unit and the MCLAG learning frame transmitting unit are provided in each of the plurality of line cards,
when the MCLAG learning frame transmitting unit has received the frame at a port of its own line card and the frame is not the MCLAG learning frame, the MCLAG learning frame transmitting unit generates and transmits the MCLAG learning frame,
when the LC learning frame transmitting unit has received the frame at a port of its own line card and the frame is not the MCLAG learning frame, the LC learning frame transmitting unit generates a LC learning frame containing a third correspondence relation between the source MAC address of the frame and the port identifier of the port which has received the frame or the MCLAG identifier associated with the port which has received the frame, and transmits the generated LC learning frame to the other line cards except its own line card, and
when the LC learning frame receiving unit has received the LC learning frame, it learns the third correspondence relation contained in the LC learning frame to the address table.

10. The switching device according to claim 7,
wherein, when the frame is received at the MCLAG port or the first port and a destination port of the frame is not the bridge port, the MCLAG learning frame transmitting unit generates and transmits the MCLAG learning frame.

11. The switching device according to claim 10,
wherein, when both of a port which has received the frame and a destination port of the frame are not the MCLAG port, the MCLAG learning frame transmitting unit does not generate the MCLAG learning frame.

12. The switching device according to claim 7,
wherein, when both of a port which has received the frame and a destination port of the frame are not the MCLAG port, the MCLAG learning frame transmitting unit does not generate the MCLAG learning frame.

* * * * *